United States Patent
King

(10) Patent No.: US 9,545,146 B1
(45) Date of Patent: Jan. 17, 2017

(54) CARRIER FOR ELECTRONIC MOBILE DEVICES

(76) Inventor: Charles E. King, Washington, DC (US)

( * ) Notice: Subject to any disclaimer, the term of this patent is extended or adjusted under 35 U.S.C. 154(b) by 886 days.

(21) Appl. No.: 13/410,446

(22) Filed: Mar. 2, 2012

Related U.S. Application Data

(60) Provisional application No. 61/448,788, filed on Mar. 3, 2011.

(51) Int. Cl.
*A45F 4/00* (2006.01)
*A45F 4/02* (2006.01)
*A45C 11/00* (2006.01)

(52) U.S. Cl.
CPC ............ *A45F 4/02* (2013.01); *A45C 2011/003* (2013.01); *A45F 2004/023* (2013.01); *A45F 2200/0525* (2013.01)

(58) Field of Classification Search
CPC .............. A45F 3/047; A45F 2200/0508; A45F 2200/0516; A45F 2200/0525; A45F 2200/0533; A45C 2011/001–2011/003
USPC ........ 224/579, 580, 661, 606, 930; 206/730, 206/734, 740, 387.14
See application file for complete search history.

(56) References Cited

U.S. PATENT DOCUMENTS

| | | | | |
|---|---|---|---|---|
| 3,254,816 A * | 6/1966 | Gray | ......................... | A45F 3/04 224/630 |
| 4,099,656 A * | 7/1978 | Neumann | ................ | A45C 3/00 294/157 |
| 4,869,364 A * | 9/1989 | Bray | .................. | G11B 33/0416 206/232 |
| 5,762,250 A * | 6/1998 | Carlton | .................... | A45C 9/00 108/43 |
| 5,887,777 A | 3/1999 | Myles et al. | | |
| 5,938,096 A | 8/1999 | Sauer et al. | | |
| 5,950,894 A * | 9/1999 | Haber | ........................... | 224/627 |
| 6,138,881 A * | 10/2000 | Paul | ......................... | A45F 3/02 224/153 |
| 6,345,751 B1 | 2/2002 | Elliot | | |
| 6,443,347 B1 | 9/2002 | Elizalde et al. | | |
| 6,460,746 B1 * | 10/2002 | Amram | ................... | A45F 3/047 224/579 |

(Continued)

OTHER PUBLICATIONS

Scottevest; Men's Travel Vest with Hidden Pockets; http://www.scottevest.com/v3_store/New_Travel_Vest.shtml; Dec. 18, 2010.

(Continued)

*Primary Examiner* — Justin Larson
*Assistant Examiner* — Scott McNurlen
(74) *Attorney, Agent, or Firm* — Jones Day

(57) ABSTRACT

Systems and methods are provided for a multi-configuration electronic device carrying case. The multi-configuration electronic device carrying case includes a protective encasing structure configured to receive and hold an electronic device. The carrying case further includes at least two adjustable straps configured to attach the encasing structure to a person in one of a plurality of configurations. The configurations include a hip holster configuration, where one adjustable strap is used for connection around a waist of the person and one adjustable strap is used for connection around one leg of the person. The configurations also include a back configuration, where one adjustable strap is used for connection around each arm of the person to attach the encasing structure to a back of the person.

16 Claims, 20 Drawing Sheets

(56) References Cited

U.S. PATENT DOCUMENTS

| | | | |
|---|---|---|---|
| 6,977,809 B2* | 12/2005 | Bovino | G06F 1/1616 190/102 |
| 7,059,503 B2 | 6/2006 | Andersen | |
| 7,090,102 B1* | 8/2006 | Lipke | 224/250 |
| 7,243,824 B2 | 7/2007 | Tabata | |
| 7,469,809 B2 | 12/2008 | Rodarte et al. | |
| D626,129 S | 10/2010 | Lutz | |
| 8,109,421 B2 | 2/2012 | McLean et al. | |
| 8,120,896 B2 | 2/2012 | Mori et al. | |
| 2001/0040109 A1 | 11/2001 | Yaski et al. | |
| 2002/0108875 A1* | 8/2002 | Feinberg et al. | 206/364 |
| 2006/0037987 A1 | 2/2006 | Lin | |
| 2006/0272968 A1 | 12/2006 | Swaim et al. | |
| 2007/0215663 A1 | 9/2007 | Chongson et al. | |
| 2007/0235493 A1 | 10/2007 | Fortson | |
| 2008/0017678 A1 | 1/2008 | Anderson et al. | |
| 2008/0078794 A1 | 4/2008 | Fletcher et al. | |
| 2008/0085025 A1 | 4/2008 | Findley | |
| 2008/0185412 A1 | 8/2008 | Hollins | |
| 2009/0020579 A1* | 1/2009 | Jackson | 224/627 |
| 2009/0090752 A1 | 4/2009 | Grech | |
| 2009/0184143 A1* | 7/2009 | Witt et al. | 224/153 |
| 2009/0302082 A1* | 12/2009 | Freeny | A45F 3/00 224/661 |
| 2010/0006384 A1 | 1/2010 | Napolitano et al. | |
| 2010/0032464 A1* | 2/2010 | Gleason, Jr. | A45F 3/08 224/631 |
| 2010/0044259 A1 | 2/2010 | Wang | |
| 2010/0108726 A1 | 5/2010 | Hilgenberg | |
| 2010/0294682 A1 | 11/2010 | Choi | |
| 2011/0002094 A1 | 1/2011 | Blouin | |
| 2011/0226828 A1 | 9/2011 | Messal | |
| 2011/0284607 A1 | 11/2011 | Hart | |
| 2011/0303579 A1 | 12/2011 | Sanders | |
| 2012/0043234 A1 | 2/2012 | Westrup | |

OTHER PUBLICATIONS

MacRumors Forums; How to carry iPad without using a man purse?; http://forums.macrumors.com/showthread.php?t=895142&page=2; Feb. 10, 2011.

MacRumors Forums; How to carry iPad without using a man purse?; http://forums.macrumors.com/showthread.php?t=895142; Feb. 10, 2011.

Grabbit; iPad Grabbit—get a grip on your iPad; http://www.ipadgrabbit.com; Jan. 1, 2011.

iPad Shoulder Holster; http://ipadshoulderholster.com; Feb. 10, 2011.

ThinkGeek; Grab-It Pack Gadget Holster; http://www.thinkgeek.com/computing/bags/c616; Feb. 10, 2011.

ThinkGeek; Gadget Hip Holster; http://www.thinkgeek.com/computing/bags/9190; Feb. 10, 2011.

ThinkGeek; iPad Hip Bag; http://www.thinkgeek.com/computing/bags/deeb/images/6409; Feb. 10, 2011.

ThinkGeek; Gadget Shoulder Holster; http://www.thinkgeek.com/computing/bags/918a; Feb. 10, 2011.

YMYL—Your Music or Your Life; Holster; http://ymylholster.com/; Feb. 10, 2011.

* cited by examiner

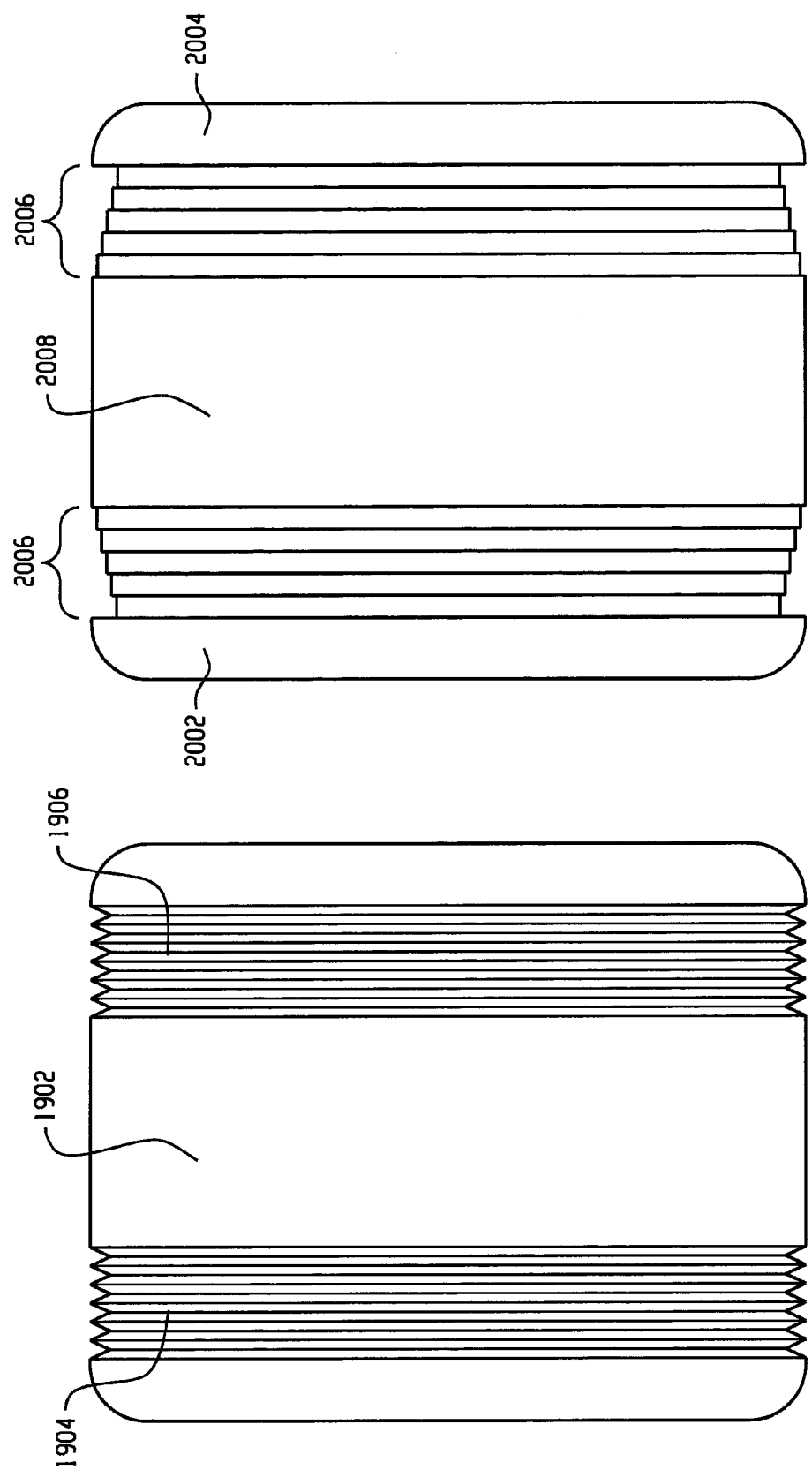

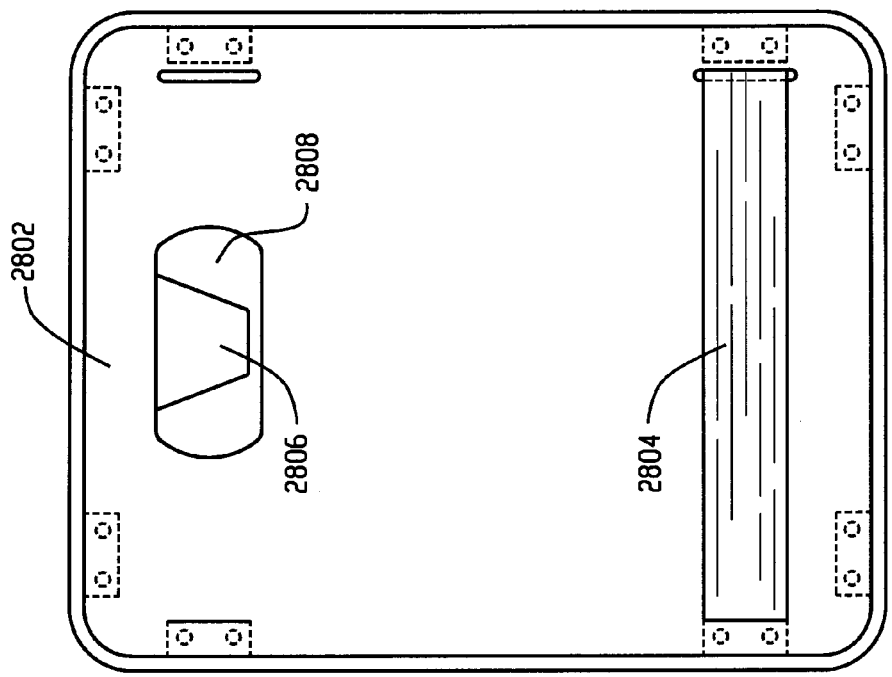
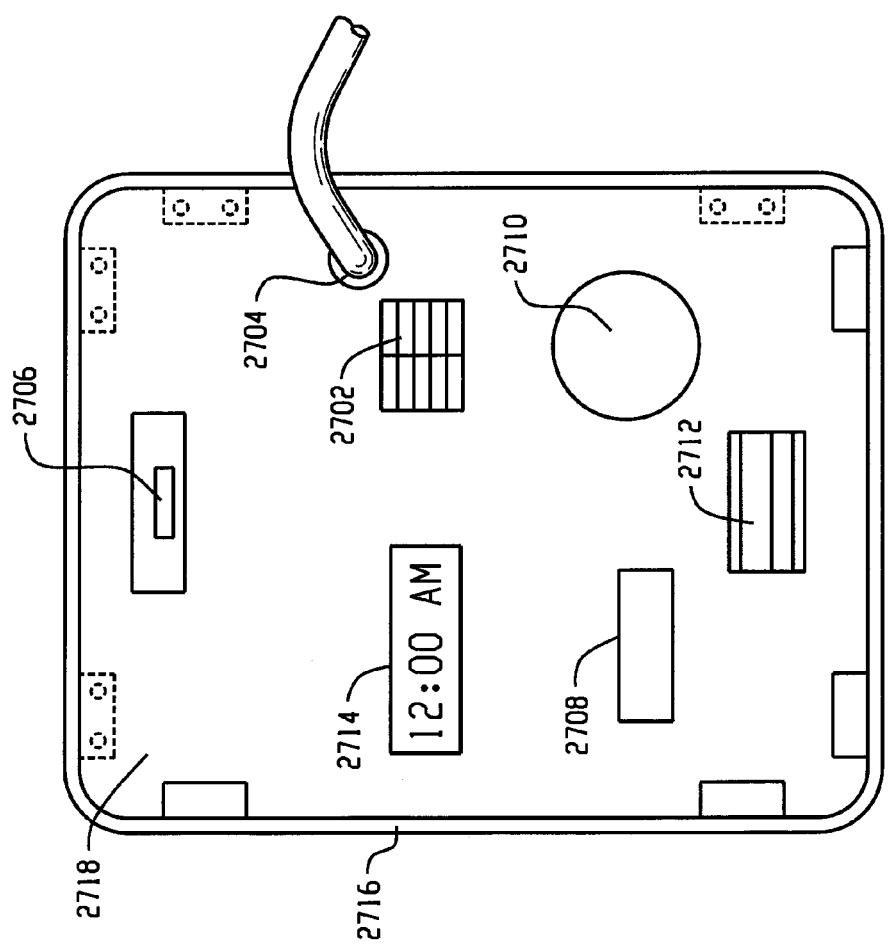
Fig. 28
Fig. 27

CARRIER FOR ELECTRONIC MOBILE DEVICES

CROSS-REFERENCE TO RELATED APPLICATIONS

This application claims priority to U.S. Provisional Patent Application No. 61/448,788, filed on Mar. 3, 2011, and entitled "Carrier for Electronic Mobile Devices," the entirety of which is herein incorporated by reference.

FIELD

This invention relates generally to electronic mobile device carriers and more particularly to electronic mobile device carriers that enable a hands-free means of transporting electronic mobile devices of different sizes.

BACKGROUND

Over the last decade, portable electronic devices have become increasingly popular among consumers. Such portable electronic devices include, for example, electronic tablet devices (e.g., Apple iPad®, Amazon Kindle Fire®, Samsung Galaxy Tab®), e-reader devices (e.g., Amazon Kindle®, Barnes & Noble NOOK®), and netbook devices (e.g., Samsung NC10®, Asus EeePC®), among others. These devices may be enabled to store a wide variety of information and to perform a number of different functions (e.g., web browsing, movie and music playback, word processing, audio and video editing, gaming, etc.). As the sophistication of these devices increases, the devices' dimensions and weight may also change, thus affecting their portability and creating transportation issues.

SUMMARY

The present disclosure is directed to a multi-configuration electronic device carrying case. In one embodiment, the multi-configuration electronic device carrying case includes a protective encasing structure configured to receive and hold an electronic device. The carrying case further includes at least two adjustable straps configured to attach the encasing structure to a person in one of a plurality of configurations. The configurations include a hip holster configuration, where one adjustable strap is used for connection around a waist of the person and one adjustable strap is used for connection around one leg of the person. The configurations also include a back configuration, where one adjustable strap is used for connection around each arm of the person to attach the encasing structure to a back of the person.

The present disclosure is also directed to a method of manufacturing a multi-configuration electronic device carrying case. The method includes providing an outer shell and positioning a soft inner shell configured to hold an electronic device within the outer shell. Four adjustable, retractable straps are attached to one side of an outside of the outer shell, where the one side of the outer shell includes a receiving structure for receiving one end of one of the adjustable, retractable straps. The adjustable straps are configured to attach the encasing structure to a person in one of a plurality of configurations. The configurations include a hip holster configuration, where one adjustable strap is used for connection around a waist of the person and one adjustable strap is used for connection around one leg of the person. The configurations also include a back configuration, where one adjustable strap is used for connection around each arm of the person to attach the encasing structure to a back of the person.

The present disclosure is further directed to a multi-configuration electronic device carrying case. The multi-configuration electronic device carrying case includes a means for holding an electronic device and a means for attaching the means for holding to a person in one of a plurality of configurations. The configurations include a hip holster configuration that provides a means for attaching around a waist of the person and one leg of the person. The configurations also include a back configuration that provides a means for attaching around each arm of the person to attach the means for holding to a back of the person.

BRIEF DESCRIPTION OF THE DRAWINGS

FIG. 19 depicts an encasing structure including a stabilized superstructure section and two accordion sections.

FIG. 20 depicts an encasing structure including a stabilized superstructure section and two telescoping sections.

FIG. 27 depicts an example multi-configuration device carrying case including a number of features.

FIG. 28 depicts an example multi-configuration device carrying case including a clip mechanism.

DETAILED DESCRIPTION

Portable electronic devices (e.g., tablet computers, e-readers, netbooks, gaming systems, etc.) have become increasingly popular over the last decade. As the price and value of these devices increases, it may be desirable to protect them from damage and to provide a safe and convenient, hands-free means of transporting them. Currently, many users transport these devices by simply holding them in one hand or under one arm, creating the possibility of device damage due to inadvertent collisions and drops. Further, when users carry devices in this manner, the device is left exposed to the elements (e.g., wind, rain, snow, extreme temperatures), and at least one of the user's hands is continually occupied by the device. Other users transport these devices inside conventional purses, backpacks, and bags, which are ill-equipped to securely hold valuable devices of different shapes and sizes and generally contain no hard outer shell to protect devices from potentially damaging forces.

Issues in transporting the portable electronic devices noted above largely stem from their dimensions and weight. Although still portable, the increased sophistication and larger display sizes of certain devices have caused them to increase in size considerably (e.g., one version of the Apple iPad® has dimensions 9.56 inches×7.47 inches×0.5 inches and a weight of 1.5-1.6 pounds). As such, these portable electronic devices do not easily fit within a pocket nor do they readily allow for clipping to the user's waist belt. Most conventional electronic mobile device carriers equipped for cell phones or other smaller electronics may not be usable for the larger, heavier portable electronic devices described above.

Figure 1:
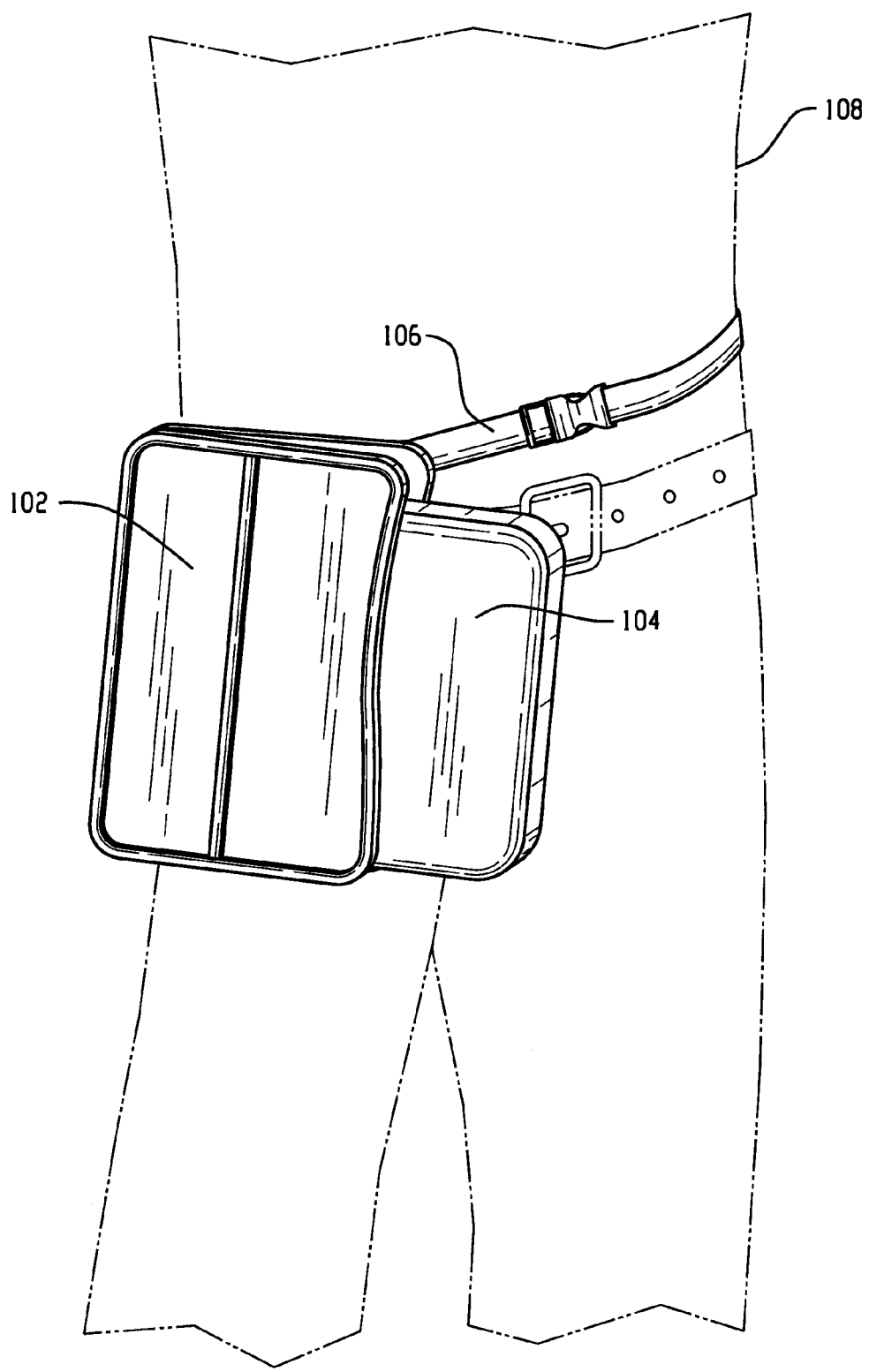
FIG. 1 depicts an electronic device partially-removed from an example multi-configuration device carrying case.

FIG. 1 depicts an electronic device partially-removed from an example multi-configuration device carrying case. The carrying case comprises a protective encasing structure 102 designed to receive and hold the electronic device 104 and/or other portable electronic devices. Unlike a conventional purse, briefcase, or backpack, the protective encasing structure's dimensions are designed to be proportionate to that of the electronic device 104, allowing the device to be held securely and eliminating excessive movement and shifting within the carrying case. The protective encasing structure 102 may be equipped with a hard outer shell material (e.g., polycarbonate composite, metal, leather, hardened glass, plexiglass, composite material, etc.) and a soft, shock-absorbing inner material (e.g., cloth, memory foam, visco-elastic polyurethane foam, etc.). Both the outer and inner materials are designed to protect the electronic device 104 from damage due to an inadvertent collision or drop. The encasing structure 102 may also include a temperature insulating material configured to protect the device from extreme temperature conditions.

The device carrying case of FIG. 1 also includes one or more adjustable straps 106 configured to attach the encasing structure 102 to a user 108, providing a hands-free means of transporting the electronic device 104 and/or other devices. The adjustable straps 106 may be lengthened and shortened to accommodate a body size of the user 108. Further, the adjustable straps 106 may be configured to allow the carrying case to be worn in a variety of configurations (e.g., a hip holster configuration, a back configuration, a chest configuration, a side holster configuration, etc.). In any configuration, the multi-configuration device carrying case of FIG. 1 is designed to be a comfortable, unobtrusive, "body attachable" product that allows for hands-free transportation of a wide variety of different-sized electronic mobile devices. Further, the device carrying case of FIG. 1, unlike most traditional carrying cases (e.g., backpacks, purses, fanny packs), may be designed to be easily laid flat on any surface, providing an aesthetically pleasing, "desktop-like" surface. In one embodiment, the device carrying case may include a clip mechanism configured to attach the encasing structure 102 to the user's waist belt, with or without support from the adjustable straps 106.

Figure 2:
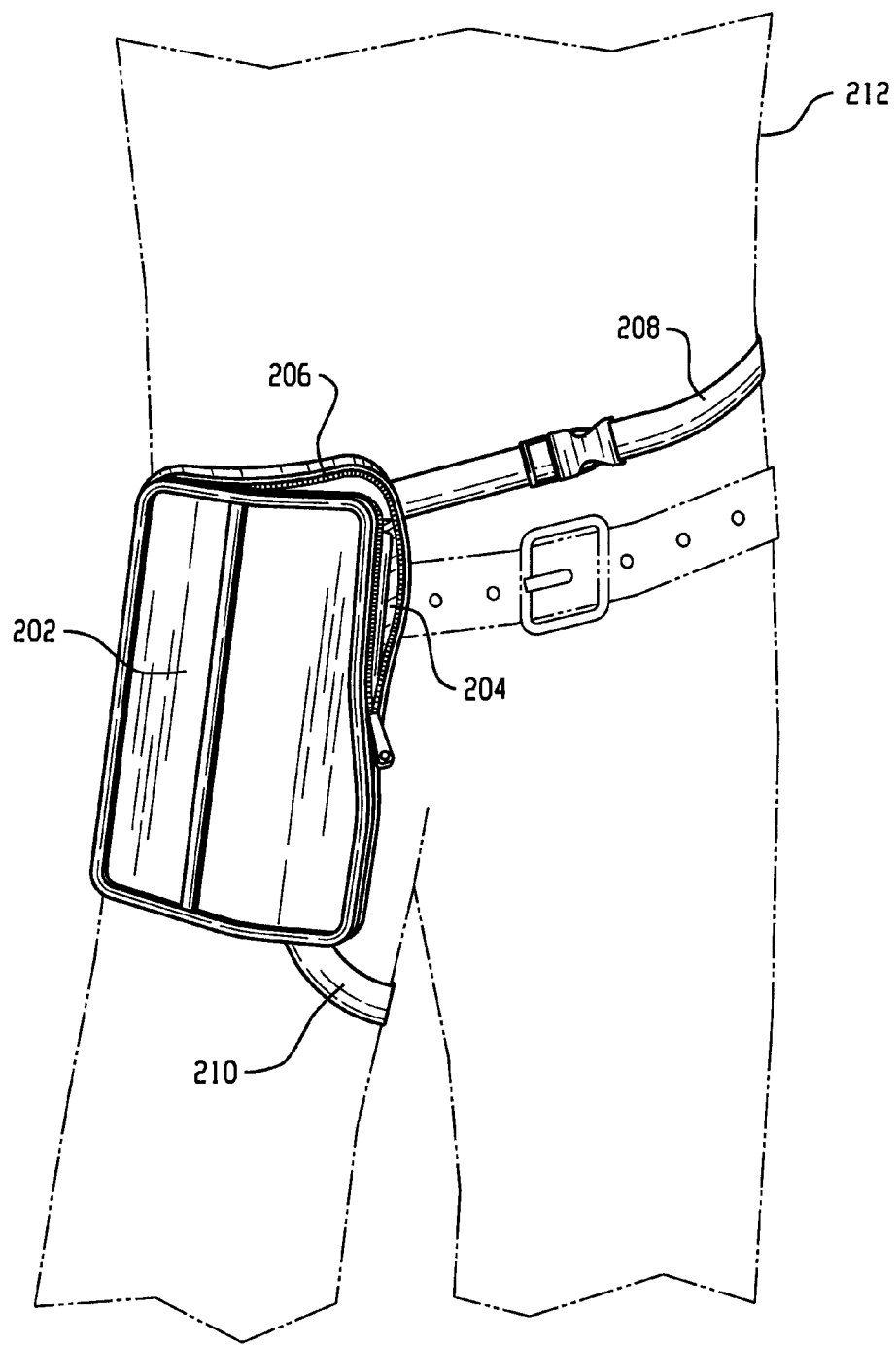
FIG. 2 depicts an electronic device secured within an example multi-configuration device carrying case used in a hip holster configuration.

FIG. 2 depicts an electronic device secured within an example multi-configuration device carrying case used in a hip holster configuration. As in FIG. 1, the carrying case includes a protective encasing structure 202 configured to receive and hold the electronic device 204 and/or other devices. In FIG. 2, the protective encasing structure 202 includes a zipper open/close feature 206, although other embodiments may include more sophisticated open/close mechanisms (e.g., airtight and/or watertight seals, electronic locking mechanisms, magnetic locking mechanisms, etc.). The carrying case of FIG. 2 further includes at least two adjustable straps 208, 210 configured to attach the encasing structure 202 to a user 212: one adjustable strap 208 is used for connection around a waist of the user 212 and the other adjustable strap 210 is used for connection around an upper portion of one leg of the user 212. As depicted in FIG. 2, the device carrying case in this configuration is designed to hold the electronic device 204 at an upper thigh area of the user 212, allowing the device 204 to rest on either the user's right or left hip. The use of at least two straps 208, 210 ensures that the carrying case will be held in a stable manner and protects the device from excessive movement and bouncing, allowing the device to be carried in a hands-free manner.

Figure 3:
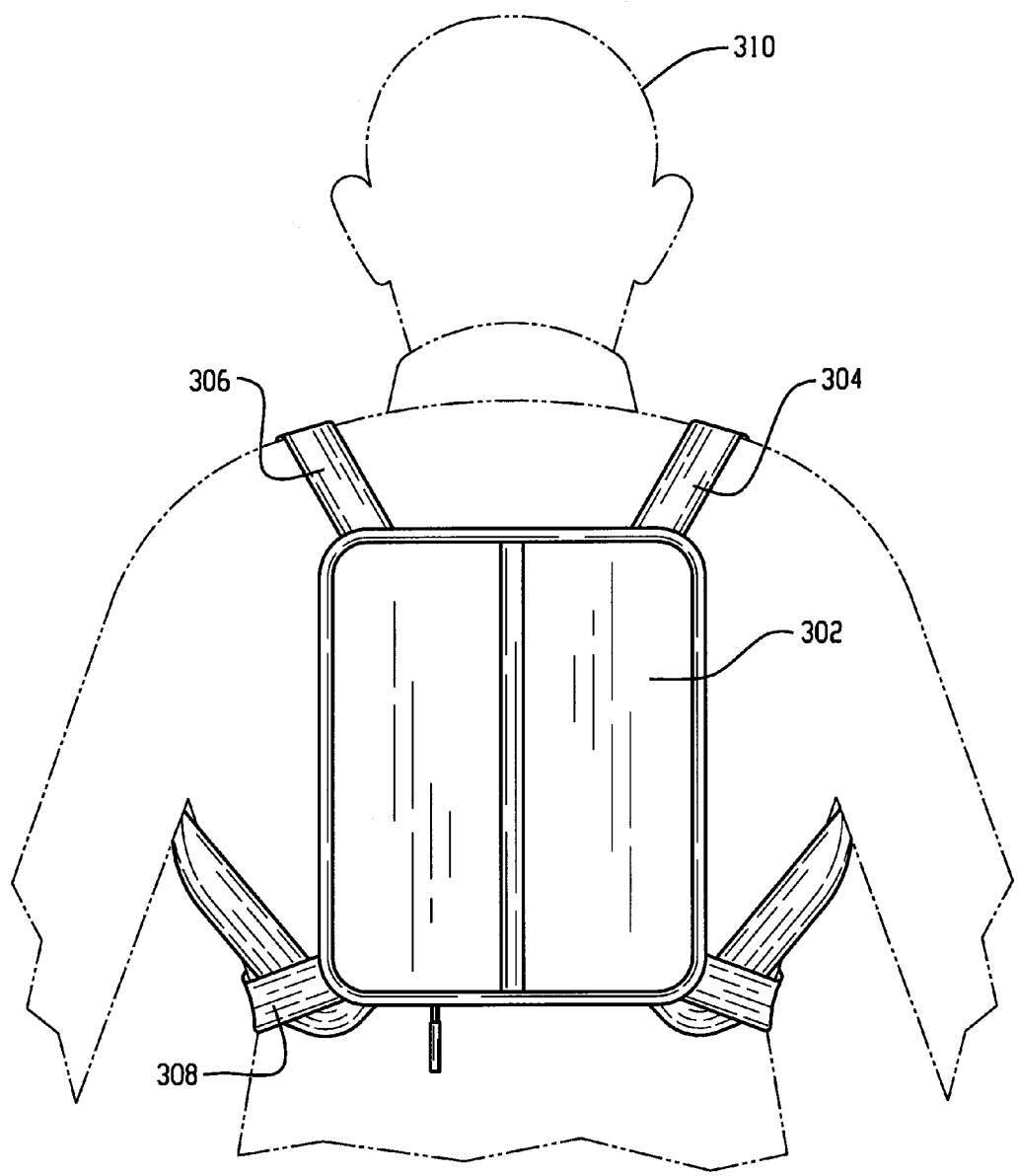
FIGS. 3-5 depict an example multi-configuration device carrying case used in a back configuration.
Figure 4:
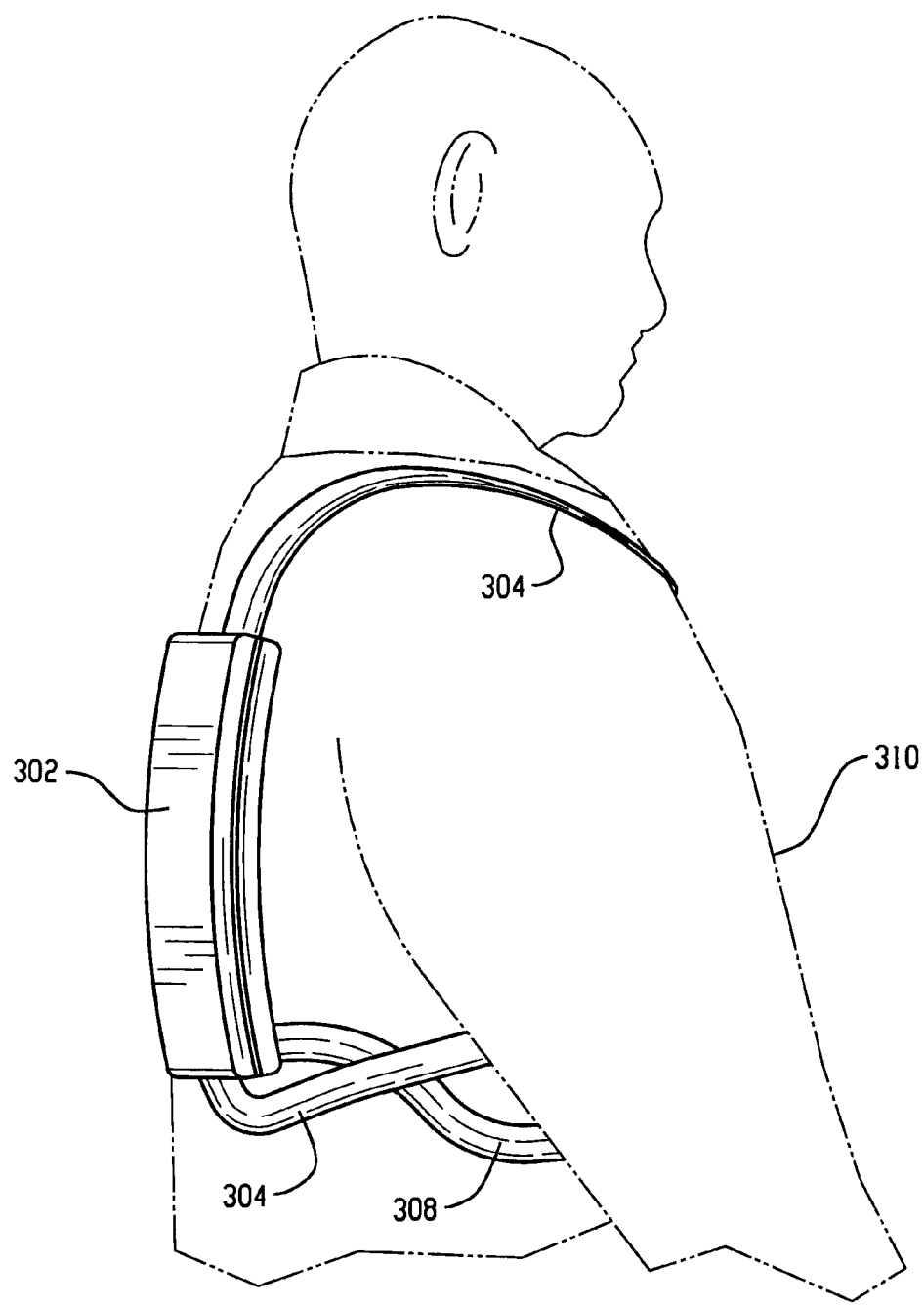
Figure 5:
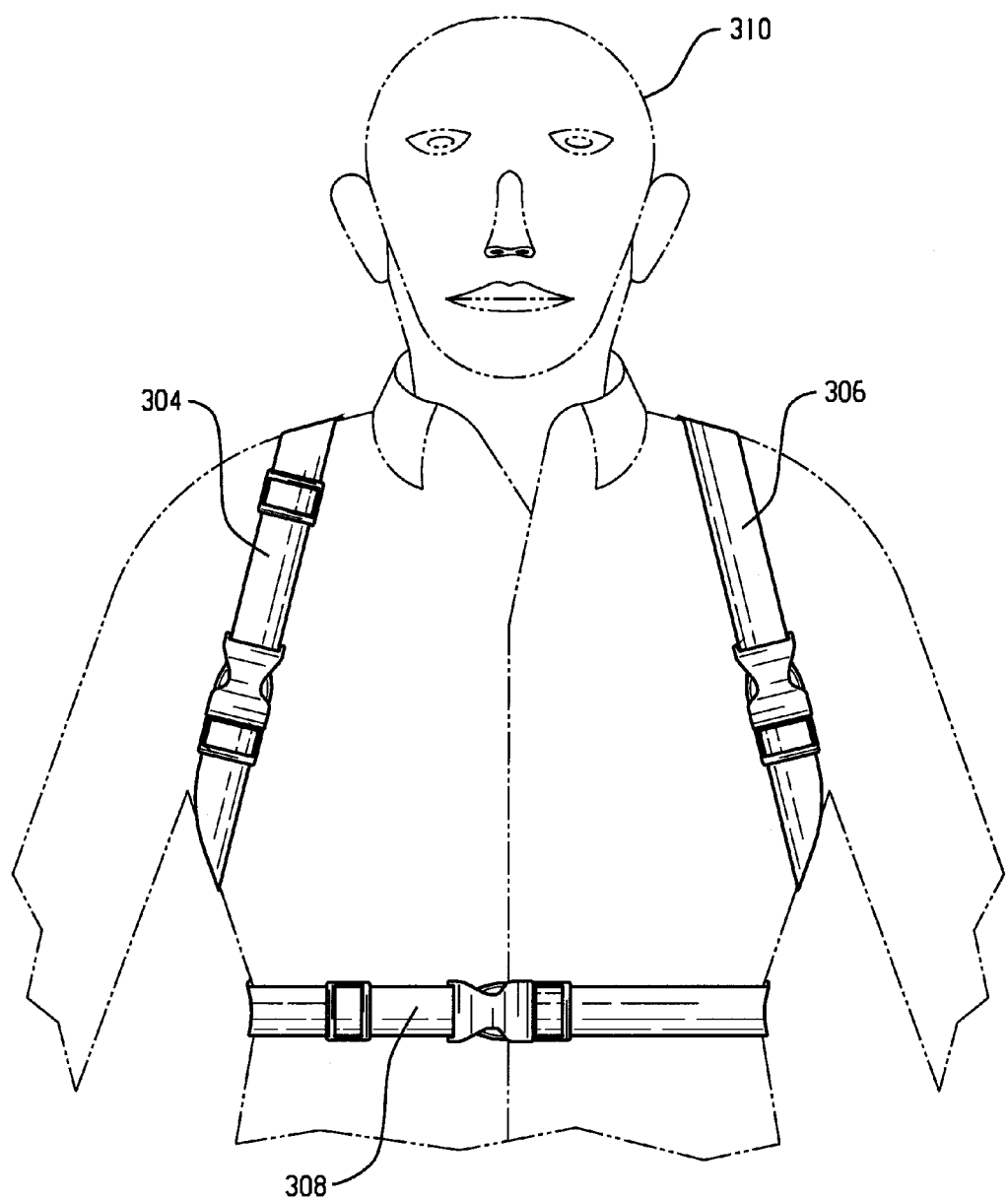

FIGS. 3-5 depict an example multi-configuration device carrying case used in a back configuration. As in FIGS. 1 and 2, the device carrying case of FIGS. 3-5 includes a protective encasing structure 302 configured to receive and hold an electronic device. The device carrying case further includes a number of adjustable straps 304, 306, 308 configured to attach the encasing structure 302 to a back area of a user 310: one adjustable strap 306 is used for connection around a left arm of the user 310, one adjustable strap 304 is used for connection around a right arm of the user 310, and one adjustable strap 308 is used for connection around a waist or middle portion of the user 310. In the back configuration, the protective encasing structure 302 may be positioned on the user's upper or lower back area.

Figure 6:
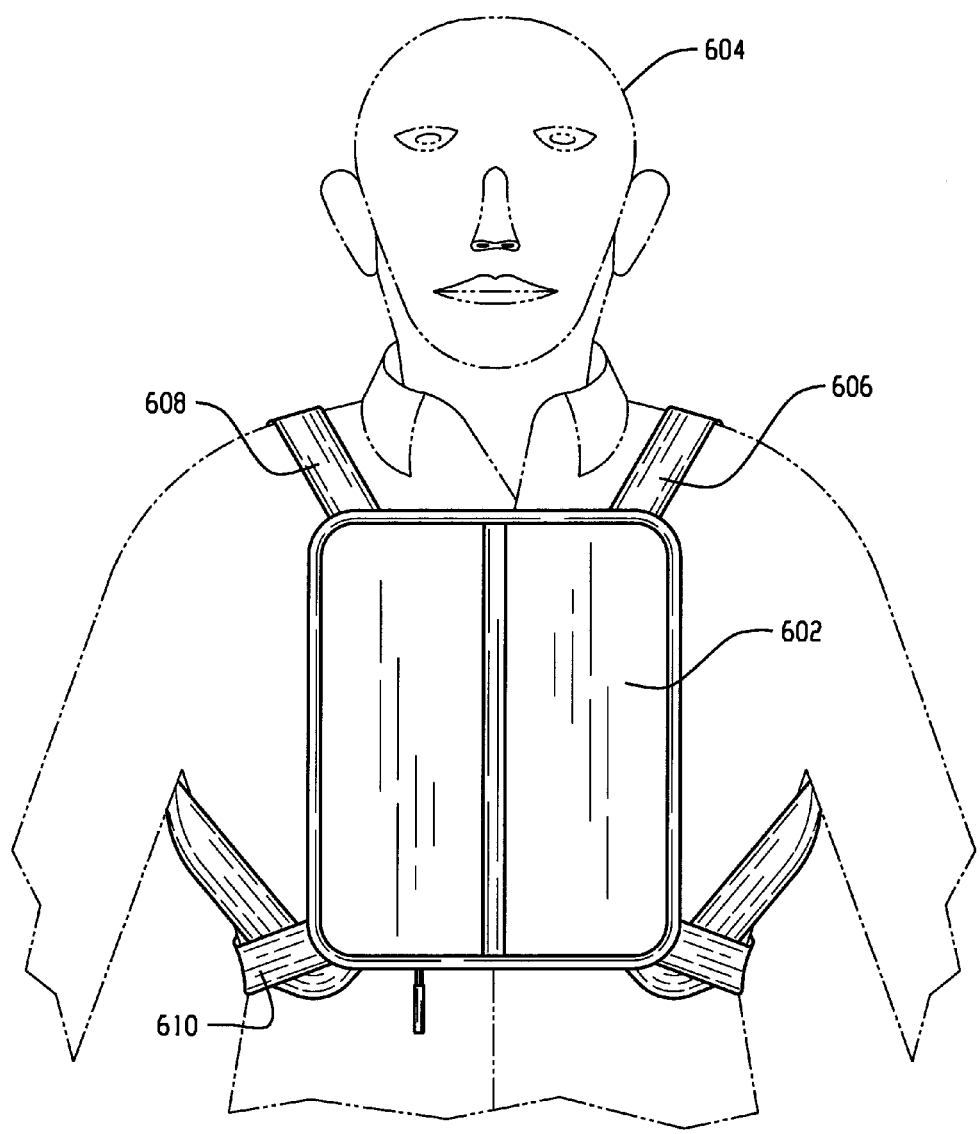
FIG. 6 depicts an example multi-configuration device carrying case used in a front configuration.

FIG. 6 depicts an example multi-configuration device carrying case used in a front configuration. The front configuration is similar to the back configuration of FIGS. 3-5, except that an encasing structure 602 is attached to a front side of a user 604. Like the back configuration, the front configuration may include one adjustable strap 606, 608 for connection around each arm of the user 604 and one adjustable strap 610 for connection around a waist of the user 604.

Figure 7:
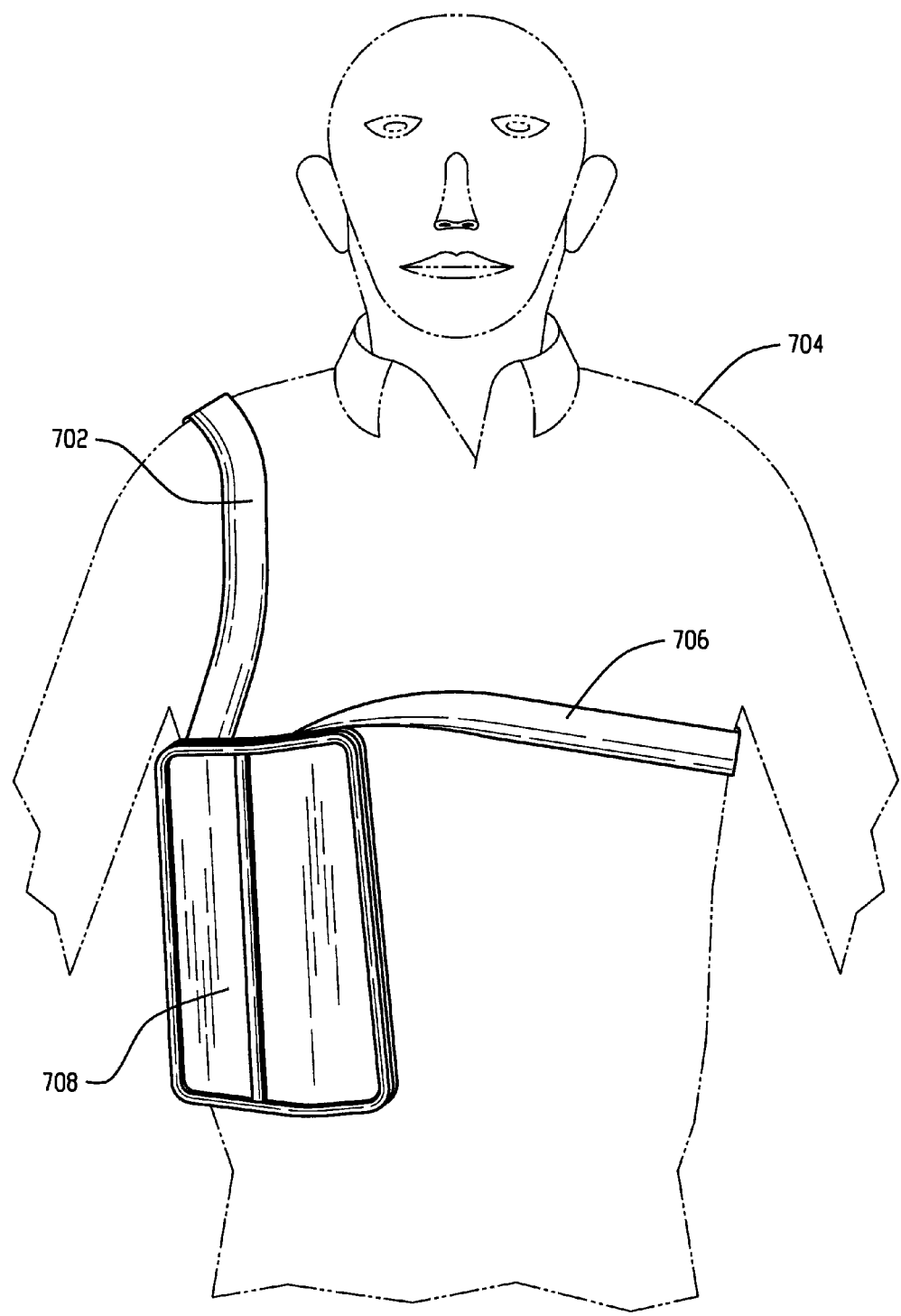
FIG. 7 depicts an example multi-configuration device carrying case used in a side holster configuration.

FIG. 7 depicts an example multi-configuration device carrying case used in a side holster configuration. The side holster configuration includes one adjustable strap 702 for connection around one arm of a user 704 and one adjustable strap 706 for connection around a chest of the user 704. In this configuration, an encasing structure 708 is attached under the one arm of the user 704. In another configuration, the multi-configuration device carrying case can be used in a double holster configuration. In such a configuration, the encasing structure 708 holds one electronic device (e.g., a tablet device) under one arm, while the adjustable strap 706 configured for connection around the chest of the user 704 can be configured to carry a second electronic device (e.g., a phone, a second tablet device) under the other arm of the user 704. Such a configuration can be accomplished by clipping the second electronic device to the adjustable strap 706 or by incorporating a second encasing structure, of the same or different size, to the adjustable strap 706 for carrying the second electronic device.

In all configurations of the multi-configuration device carrying case, the encasing structure is attached close to the user's body. In light of this, one embodiment of the encasing structure may allow a variety of health and vital signs data to be read from the user's body (e.g., heart rate, body temperature, perspiration level). If the health and vital signs data indicate that the user is in distress, the encasing structure may be configured to output an alert signal autonomously or via an enclosed electronic device.

Figure 8:
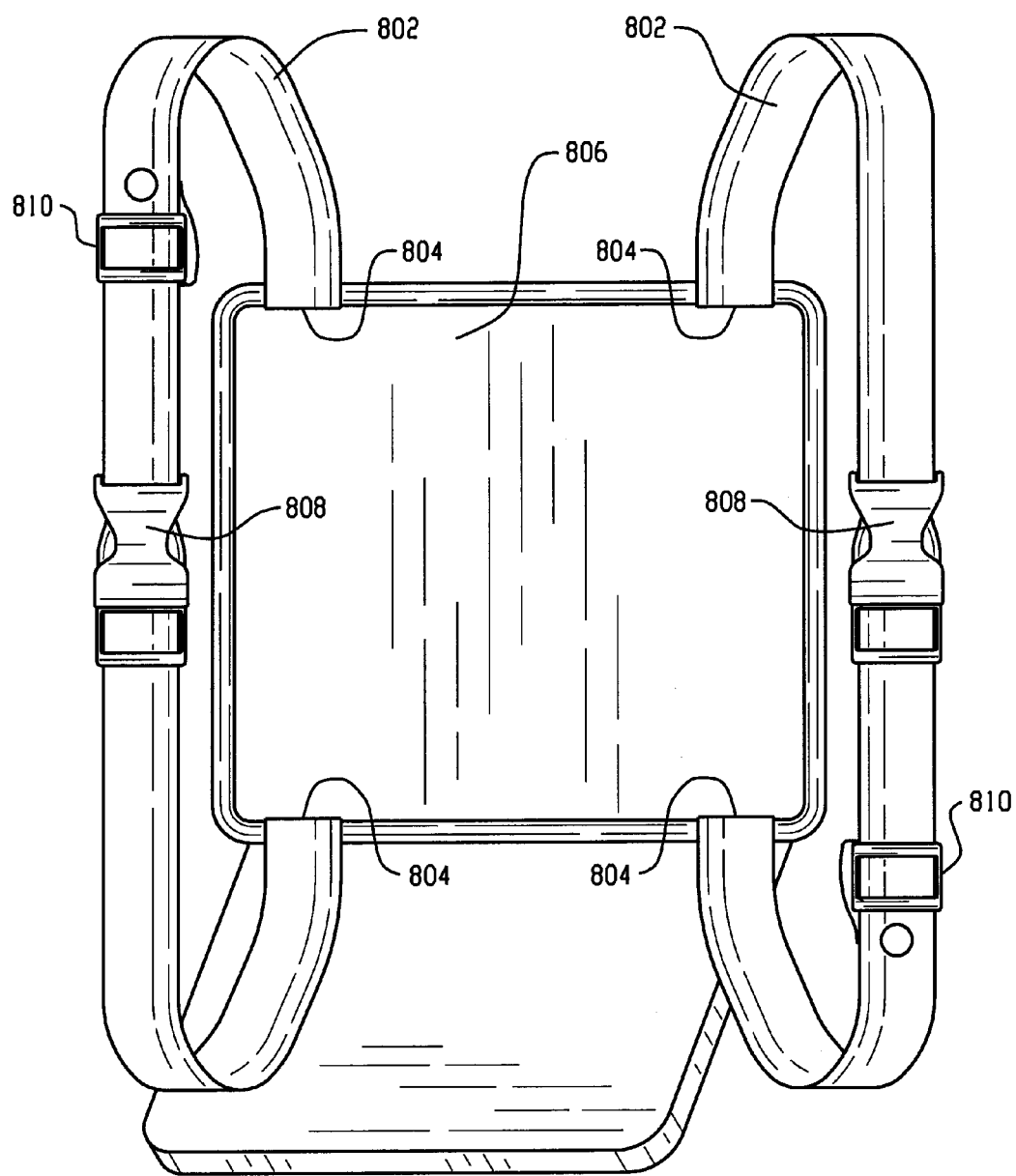
FIG. 8 depicts adjustable straps for use with a multi-configuration device carrying case.

FIG. 8 depicts adjustable straps for use with a multi-configuration device carrying case. The adjustable straps 802 may be approximately 1-2 inches in width, or wider, and may be composed of a sturdy, durable material (e.g., nylon). The straps 802 may be lengthened and shortened using a number of different mechanisms. In FIG. 8, a first end 804 of each adjustable strap 802 is permanently connected to an encasing structure 806, and a second end of each adjustable strap 802 comprises a buckling device 808. When in use, the straps 802 in FIG. 8 are wrapped around a portion of a user's body and joined with another strap using the buckling devices 808. In another embodiment, a first end of each strap is permanently connected to the encasing structure, and a strap is utilized by connecting a second end of the strap to a receiving structure on the encasing structure. In FIG. 8, the straps are lengthened and shortened by feeding more or less strap material through strap adjustment devices 810. In other embodiments, the straps may be retractable straps, which may be lengthened and shortened through the use of a spring-loaded spindle or other retraction mechanism configured to keep the strap under an appropriate amount of tension around the user's body.

Figure 9:
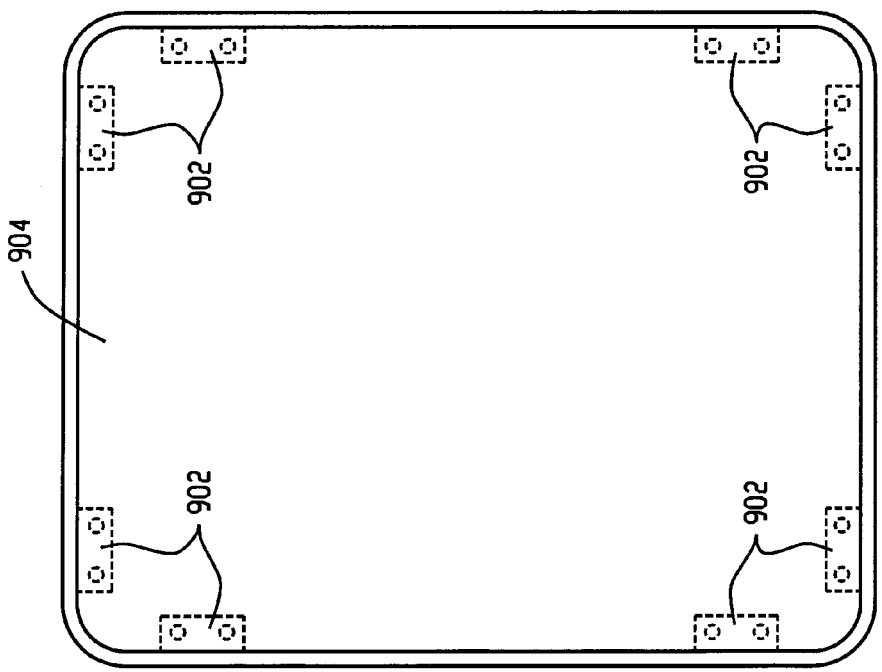
FIG. 9 depicts areas of an encasing structure to which an end of an adjustable strap may be connected.

FIG. 9 depicts areas of an encasing structure to which an end of an adjustable strap may be connected. The areas 902 may be places on side 904 of the encasing structure where the end of the strap is permanently attached, as is illustrated in FIG. 8, or the areas 902 may comprise receiving structures configured to make a temporary connection with a strap pulled over from an opposite side of the encasing structure. The areas 902 of FIG. 9 allow for at least four adjustable straps to be used, and these four straps allow a device carrying case to be worn in a variety of different configurations (e.g., hip holster, back, front, side holster, etc.). For example, the adjustable strap used for connection around the leg in the hip holster configuration of FIG. 2 may be reused for connection around the waist in the back and front configurations of FIGS. 3-6. Similarly, the adjustable strap used around the waist in the hip holster configuration of FIG. 2 may be reused for connection around the chest in the side holster configuration of FIG. 7.

Figure 10:
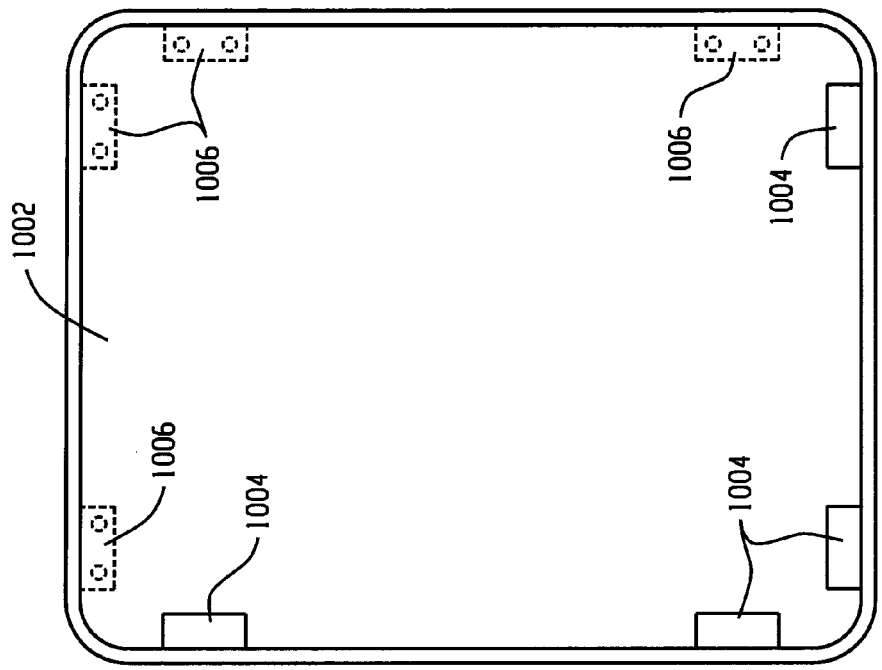
FIG. 10 depicts retraction ports and attachment ports for use with retractable straps.

FIG. 10 depicts retraction ports and attachment ports for use with retractable straps. As noted above, adjustable straps used with a device carrying case may comprise retractable straps, which may be configured to recede into an encasing structure 1002 when not in use. Each retractable strap utilizes a retraction port 1004 and an attachment port 1006. The retractable strap, when not being used, retracts into a compartment of the encasing structure 1002 through the strap retraction port 1004. When the strap is to be used, it is removed from the strap retraction port 1004, pulled across a portion of a user's body, and finally connected to the appropriate strap attachment port 1006 on an opposite side of the encasing structure 1002. When connected at the strap attachment port 1006, the retractable strap is configured to automatically adjust its tension to conform to a user's body for maximum comfort in a variety of situations (e.g., standing, walking, running, sitting). Further, the retractable strap is configured to be versatile and adjustable to fit both men and women of all different sizes.

Figure 11:
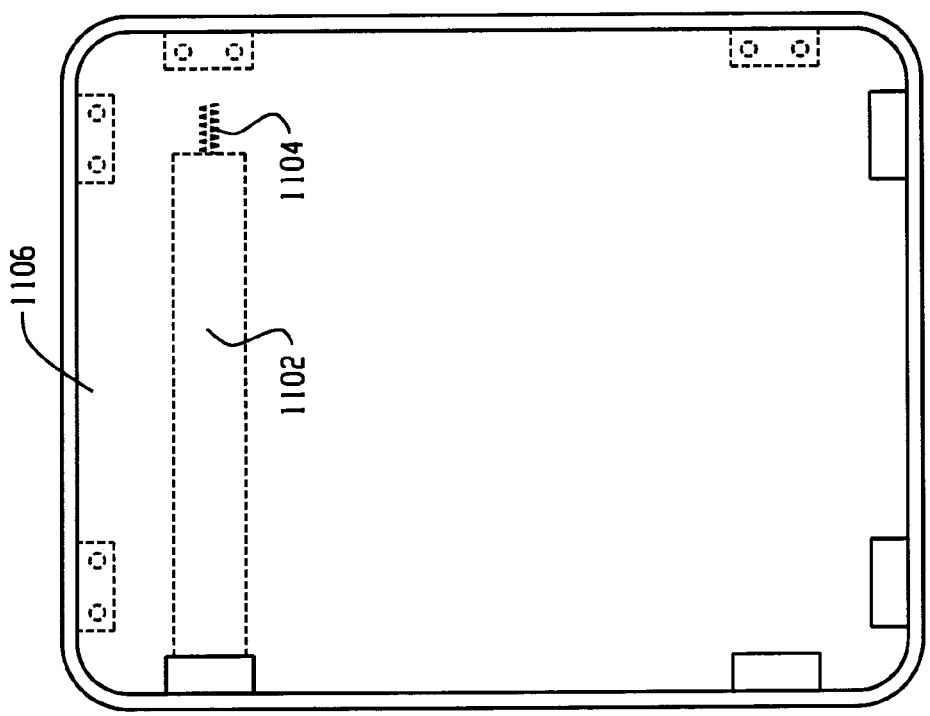
FIG. 11 depicts an internal strap anchor and a retractable strap contained between a first layer and a second layer of an encasing structure.

FIG. 11 depicts an internal strap anchor and a retractable strap contained between a first layer and a second layer of an encasing structure. In FIG. 11, a first end of the retractable strap 1102 is connected to the internal strap anchor 1104, which provides tension for retracting the strap 1102 into the encasing structure 1106 and for holding the encasing structure 1106 near a user's body. The internal strap anchor 1104 may be, for example, a spring. In this design, a portion of the strap 1102, regardless of whether the strap 1102 is fully retracted or in use, will be contained between the first layer and the second layer of the encasing structure 1106, hidden from view. When fully retracted, all of the strap 1102 will be retracted internally within the encasing structure 1106, due to the tension from the anchor 1104. When the strap 1102 is being used, the tension from the internal strap anchor 1104 may be configured to be great enough to hold the encasing structure 1106 snugly against the user's body but not too great to cause discomfort to the user.

Figure 12:
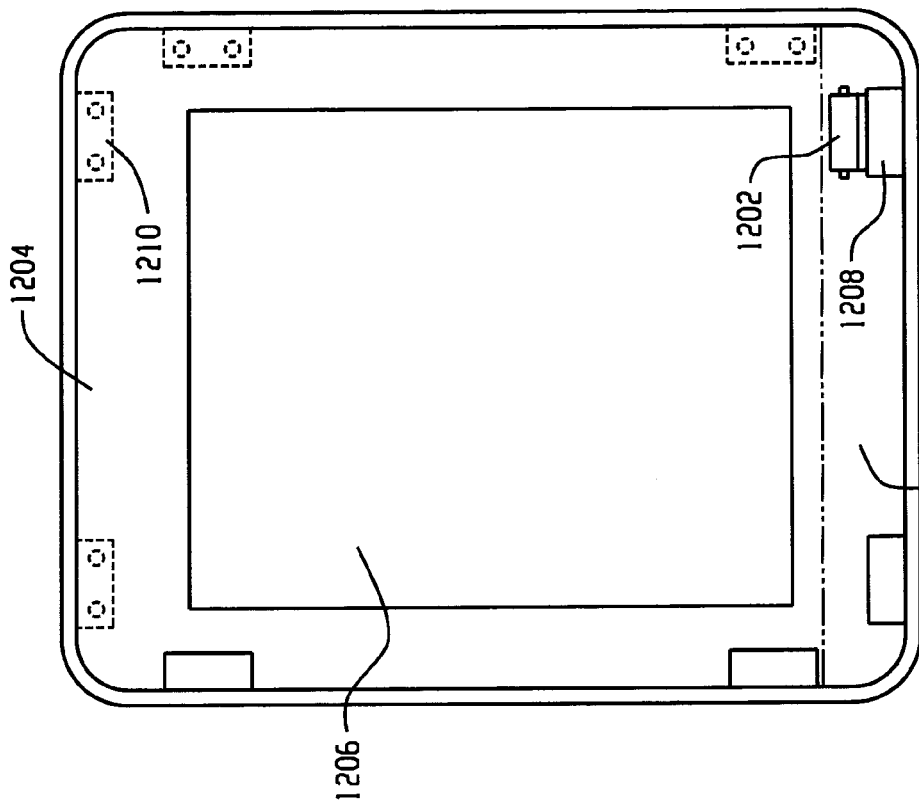
FIG. 12 depicts a spring-loaded spindle for use as an internal strap anchor.

FIG. 12 depicts a spring-loaded spindle for use as an internal strap anchor. The spring-loaded spindle 1202 may provide tension to retract a strap fully into an encasing structure 1204 and to hold an electronic device 1206 near a user's body when in use. As illustrated in FIG. 12, the strap retracts around the spring-loaded spindle 1202. The user's pulling of the strap out of a strap retraction port 1208 causes the spring-loaded spindle 1202 to dispense a length of strap, which is kept under an appropriate amount of tension after connection at a strap attachment port 1210. The spring-loaded spindle 1202 may retract the strap into a strap compartment 1212 at one end of the encasing structure 1204.

Figure 13:
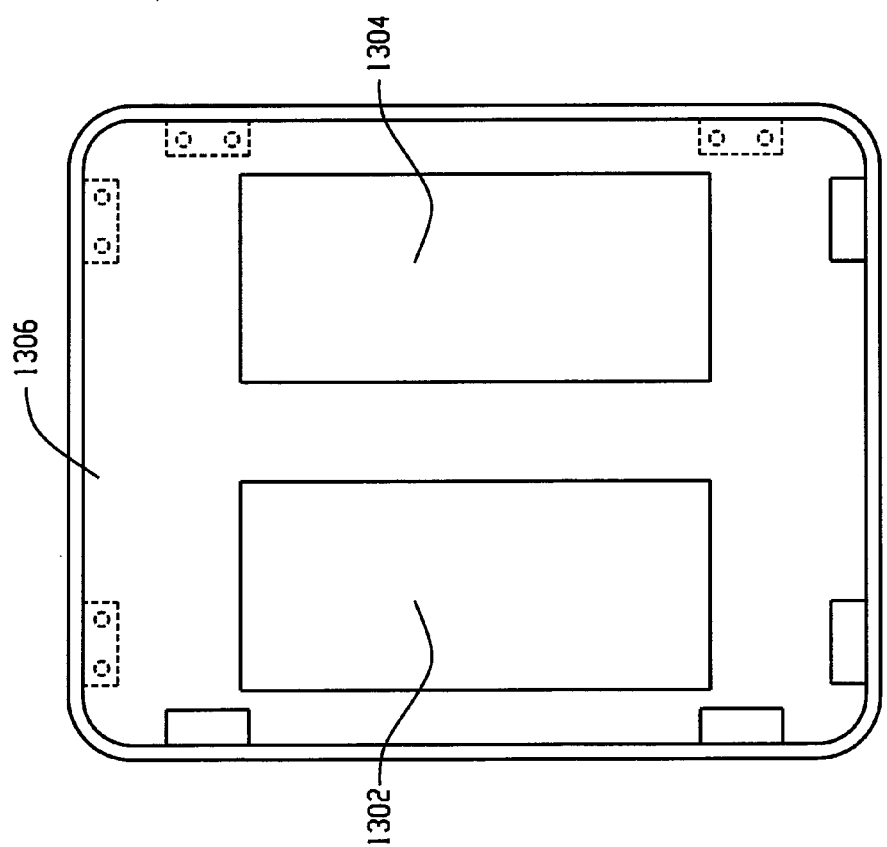
FIG. 13 depicts an example multi-configuration device carrying case with a photovoltaic solar panel array and a motion energy capture mechanism.

FIG. 13 depicts an example multi-configuration device carrying case with a photovoltaic solar panel array and a motion energy capture mechanism. The photovoltaic solar panel array 1302 and the motion energy capture mechanism 1304 are supplemental power mechanisms configured to provide power to an electronic device within the carrying case 1306 and/or to an external device using the carrying case 1306 as a power supply. The photovoltaic solar panel array 1302 and the motion energy capture mechanism 1304 may also be configured to charge a battery included on the carrying case 1306. The photovoltaic solar panel array 1302 is configured to convert sunlight into electrical power, and the motion energy capture mechanism 1304 is configured to convert kinetic energy of movement (e.g., the up-and-down bobbing motion that may occur while a user is walking or running) into electrical power.

Figure 14:
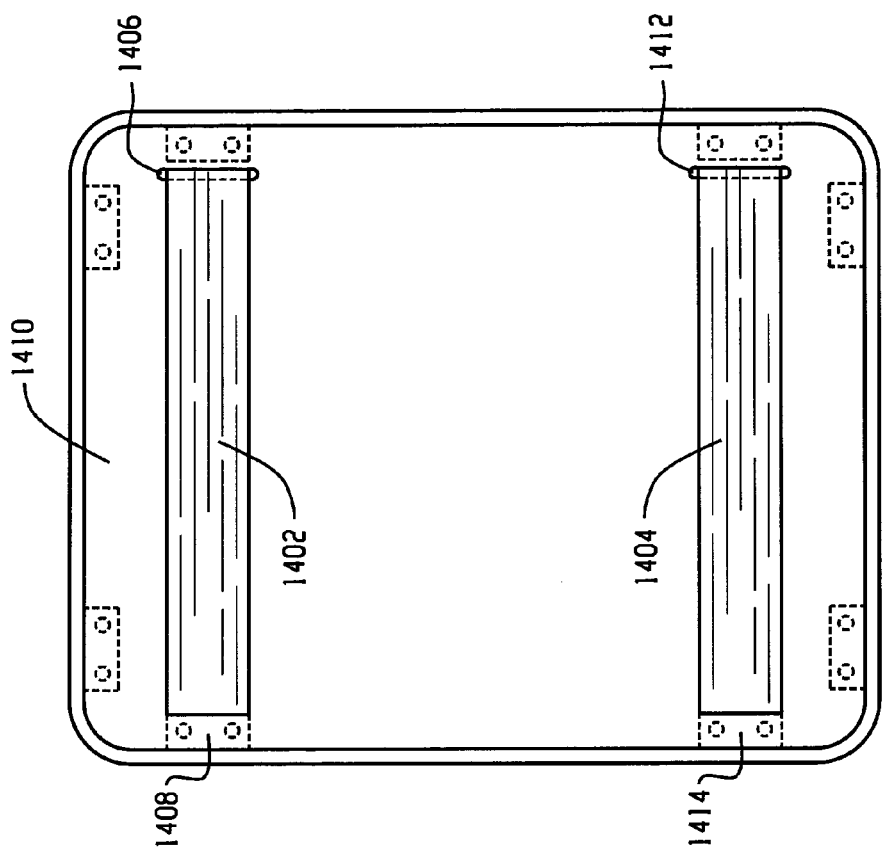
FIG. 14 depicts retractable straps for use in a hip holster configuration.

FIG. 14 depicts retractable straps for use in a hip holster configuration. To facilitate the hip holster configuration, a user engages and connects first 1402 and second 1404 horizontal retractable straps. An end of the first retractable strap 1402 is removed from a first strap retraction port 1406, pulled across the user's waist, and secured into a first strap attachment port 1408 of an encasing structure 1410. Similarly, an end of the second retractable strap 1404 is removed from a second strap retraction port 1412, pulled across the user's leg, and secured into a second strap attachment port 1414 of the encasing structure 1410.

Figure 15:
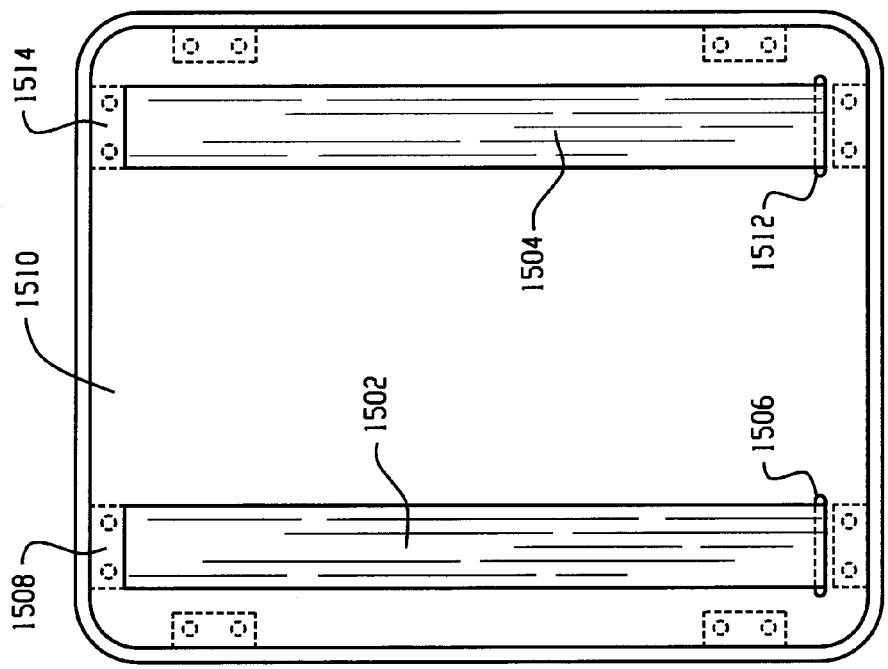
FIG. 15 depicts retractable straps used in a back configuration.

FIG. 15 depicts retractable straps used in a back configuration. In the example back configuration of FIG. 15, neither of the horizontal straps used in FIG. 14's hip holster configuration are used (in some embodiments, the same straps maybe used for both the back and hip holster configurations). Instead, to facilitate the back configuration of FIG. 15, a user engages and connects first 1502 and second 1504 vertical retractable straps. An end of the first retractable strap 1502 is removed from a first strap retraction port 1506, pulled across the user's right arm, and secured into a first strap attachment port 1508 of an encasing structure 1510. Similarly, an end of the second retractable strap 1504 is removed from a second strap retraction port 1512, pulled across the user's left arm, and secured into a second strap attachment port 1514 of the encasing structure 1510.

Figure 16:
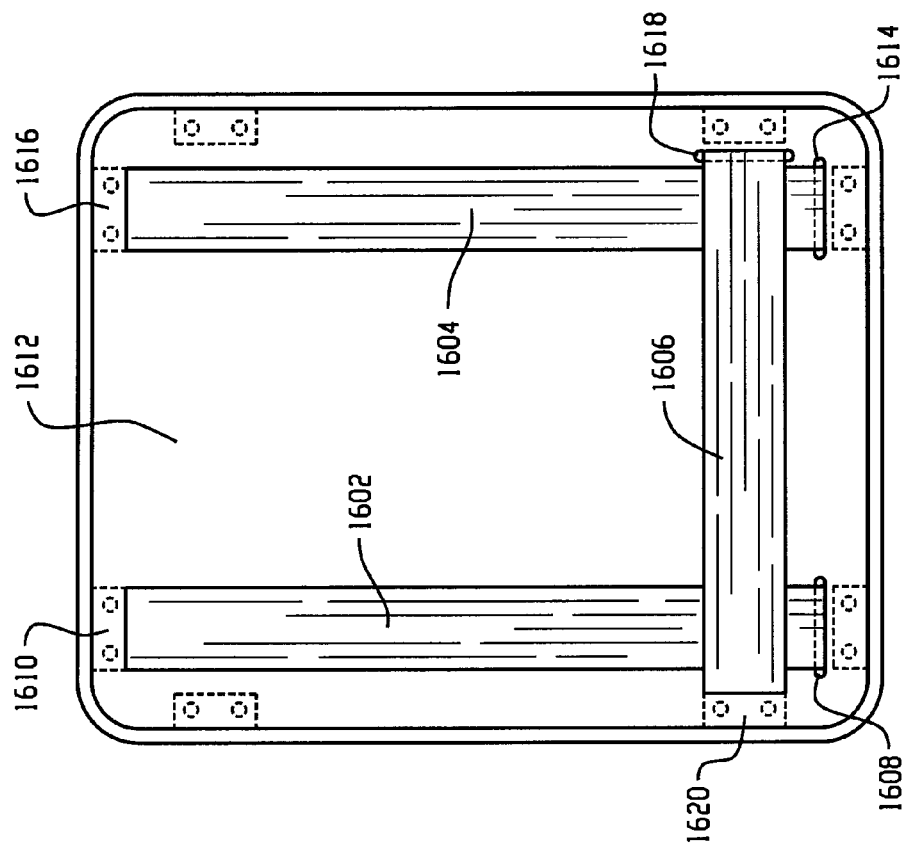
FIG. 16 depicts retractable straps used in another back configuration.

FIG. 16 depicts retractable straps used in another back configuration. Unlike the back configuration of FIG. 15, the back configuration of FIG. 16 utilizes one of the horizontal straps of FIG. 14's hip holster configuration. To facilitate the back configuration of FIG. 16, a user engages and connects first 1602, second 1604, and third 1606 retractable straps. An end of the first retractable strap 1602 is removed from a first strap retraction port 1608, pulled across the user's right arm, and secured into a first strap attachment port 1610 of an encasing structure 1612. Similarly, an end of the second retractable strap 1604 is removed from a second strap retraction port 1614, pulled across the user's left arm, and secured into a second strap attachment 1616 port of the encasing structure 1612. To add further stability, the third retractable strap 1606 is used, which comprises a horizontal strap. An end of the third retractable strap is removed from a third strap retraction port 1618, pulled across the user's waist, and secured into a third strap attachment port 1620 of the encasing structure 1612.

Figure 17:
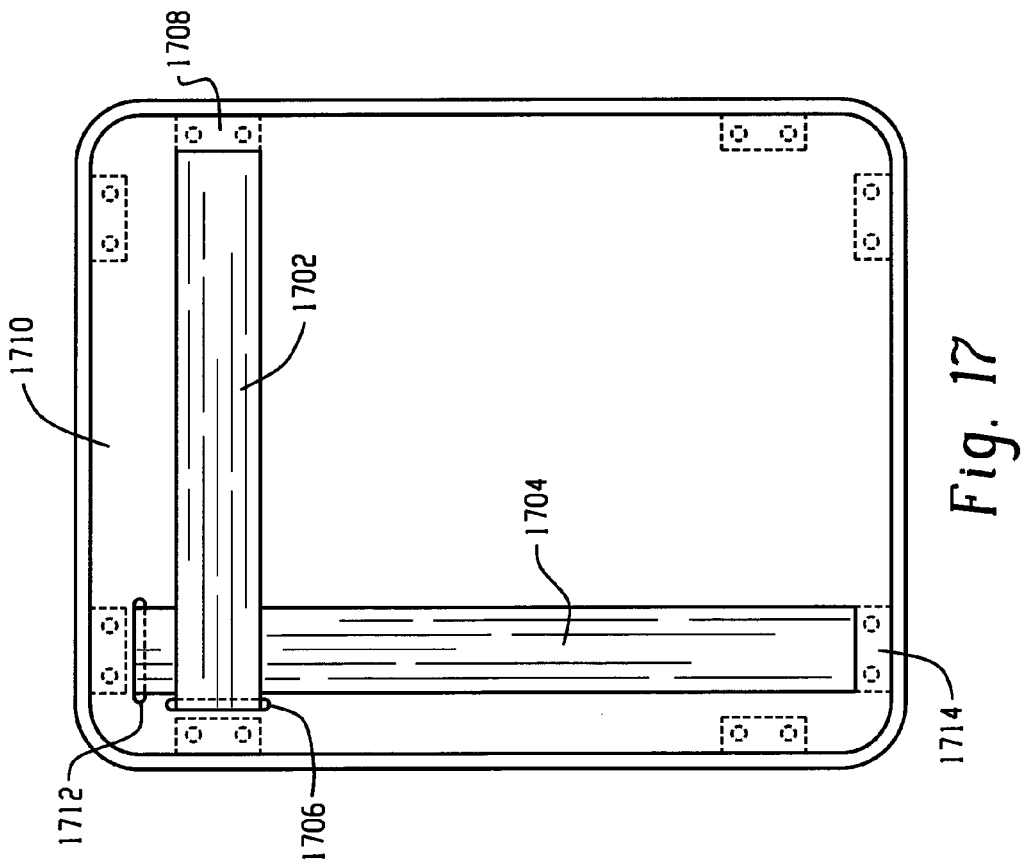
FIG. 17 depicts retractable straps used in a side holster configuration.

FIG. 17 depicts retractable straps used in a side holster configuration. The side holster configuration utilizes both horizontal and vertical straps as described above with respect to the hip holster and back configurations of FIGS. 14 and 15, respectively. To facilitate the side holster configuration, a user engages and connects first 1702 and second 1704 retractable straps. An end of the first retractable strap 1702 is removed from a first strap retraction port 1706, pulled across the user's chest, and secured into a first strap attachment port 1708 of an encasing structure 1710. Similarly, an end of the second retractable strap 1704 is removed from a second strap retraction port 1712, pulled across the user's one arm, and secured into a second strap attachment port 1714 of the encasing structure 1710.

Figure 18:
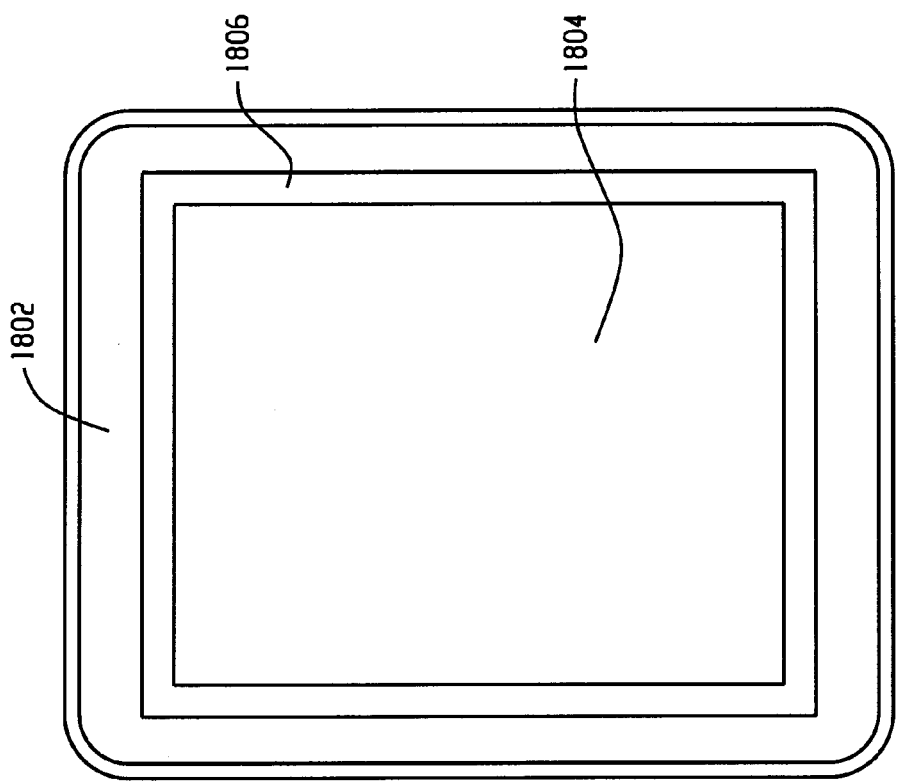
FIG. 18 depicts an encasing structure that permits access to an electronic device interface of a device held within the encasing structure.

FIG. 18 depicts an encasing structure that permits access to an electronic device interface of a device held within the encasing structure. The encasing structure 1802 may include a flap that can be opened and closed by a user. When opened, the user has full access to the electronic device interface 1804, but when closed, the device 1806 is fully shielded and protected. Another example may include removable front pieces, sliding screens that may be opened and closed, and thin film elements that allow access to the electronic device interface 1804 while otherwise shielding it from external forces and the elements.

FIG. 19 depicts an encasing structure including a stabilized superstructure section and two accordion sections. The stabilized superstructure section 1902 is a rigid portion of the encasing structure that is of fixed dimensions. By contrast, the two accordion sections 1904, 1906 may be expanded and contracted in size to conform to a size of a device to be carried. The two accordion sections 1904, 1906 may also be configured to bend slightly so as to fit the contours of a wearer's thigh, chest, waist, or back. Further, although FIG. 19 depicts the accordion sections 1904, 1906 as expandable along a width of the encasing structure, alternative embodiments implement accordion sections that allow the encasing structure to also be expandable along its length and/or thickness. In the example of FIG. 19, the stabilized superstructure section 1902 is larger along a direction of expandability than each of the accordion sections 1904, 1906 when the accordion sections 1904, 1906 are expanded to their maximum size. For instance, the stabilized superstructure section 1902 may be four to six inches in width, and each accordion section may be one to three inches in width. These dimensions may be modified in other examples for specific applications or to accommodate specific types of devices.

FIG. 20 depicts an encasing structure including a stabilized superstructure section and two telescoping sections. Like the accordion sections 1904, 1906 of FIG. 19, the telescoping sections 2002, 2004 of FIG. 20 may be configured to expand and contract in size horizontally to better conform the encasing structure to a size of a device to be carried. The telescoping sections 2002, 2004 include one or more nestable segments 2006, such that the encasing structure is contracted along a dimension when the nestable segments 2006 are nested and expanded along the dimension when the nestable segments 2006 are unnested. Further, like the accordion sections 1904, 1906 of FIG. 19, the telescoping sections 2002, 2004 may be configured to bend slightly to fit the contours of a user's body. Although FIG. 20 depicts the telescoping sections 2002, 2004 as expandable only along a width of the encasing structure, other embodiments implement telescoping sections that allow the encasing structure to also be expandable along its length and/or thickness. For example, the stabilized superstructure 2008 may be four to six inches in width, and each telescoping section may be one to three inches in width. As noted above, these dimensions may be modified in other examples for specific applications or to accommodate specific types of devices.

Figure 21:
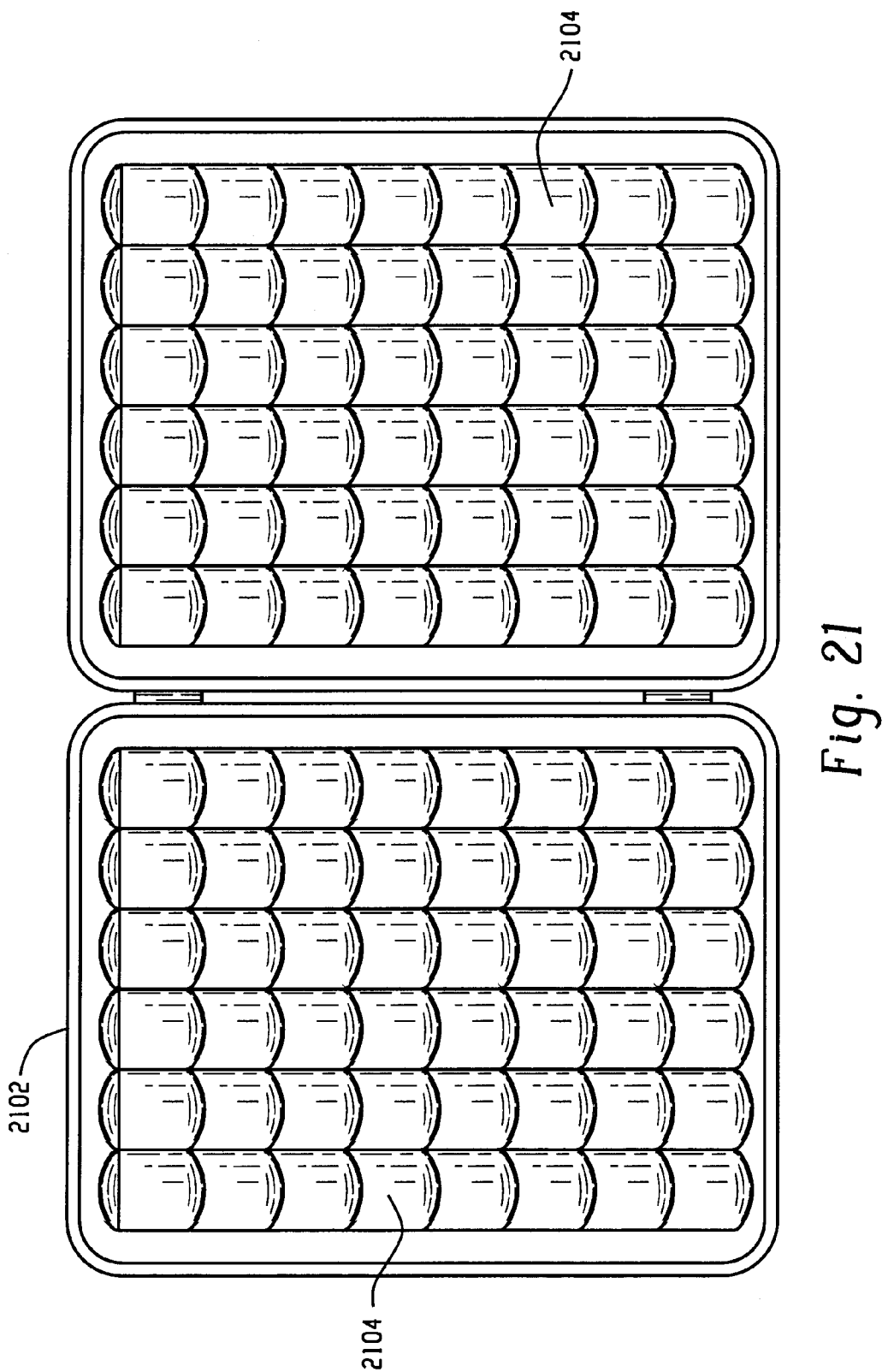
FIG. 21 depicts an interior view of an open encasing structure.

FIG. 21 depicts an interior view of an open encasing structure. In this embodiment, the encasing structure 2102 may be opened like a book (accomplished, e.g., using the zipper open/close feature 206 of FIG. 2). The interior of the encasing structure comprises a soft, shock-absorbing material 2104 (comprising, e.g., cloth, memory foam, viscoelastic polyurethane foam, etc.). The shock-absorbing material 2104 is configured to conform to a size of a particular device and to reduce device movement within the encasing structure 2102.

Figure 22:
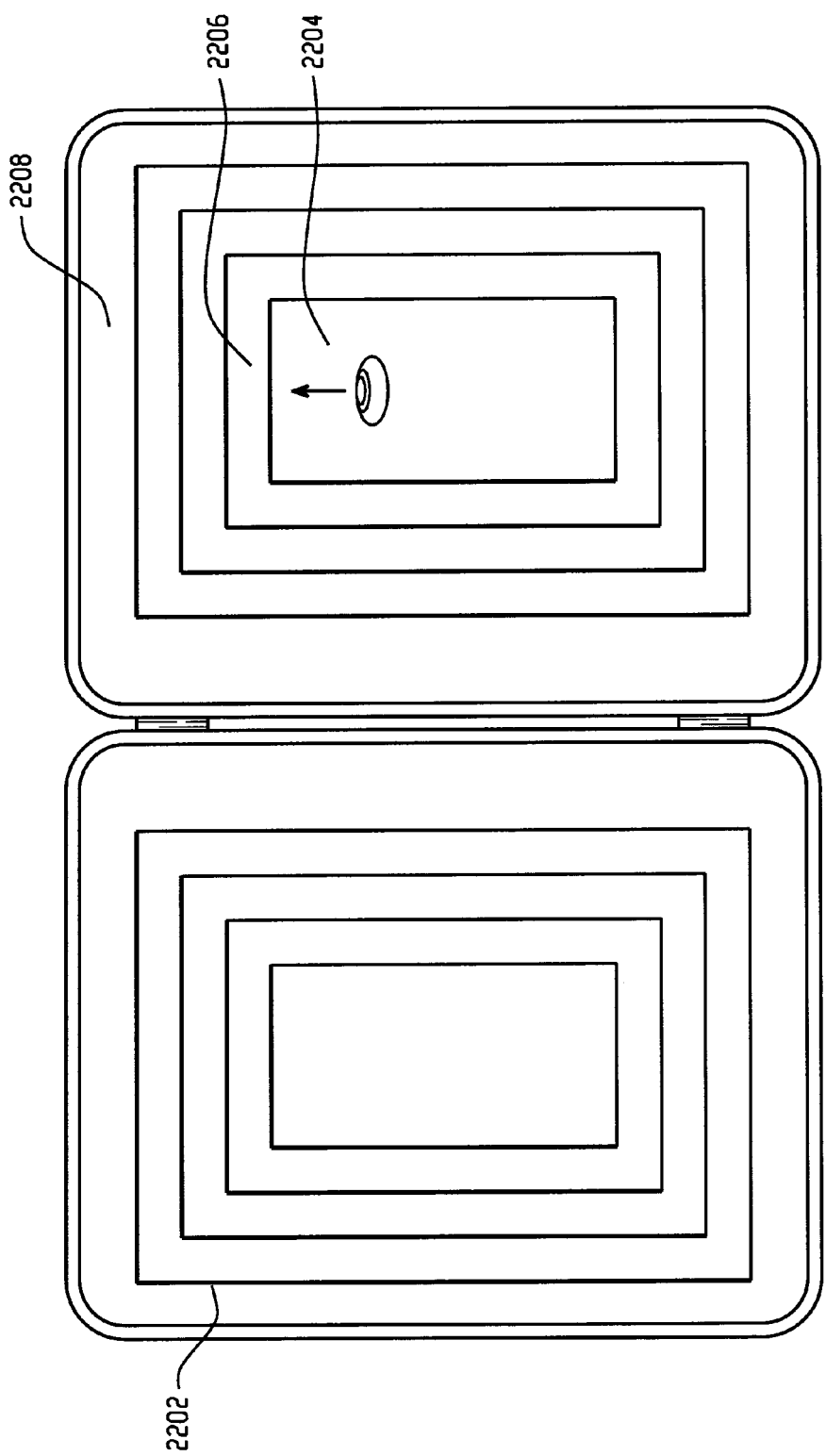
FIGS. 22 and 23 illustrate aspects of a protective inner layer including a plurality of nested frames.
Figure 23:
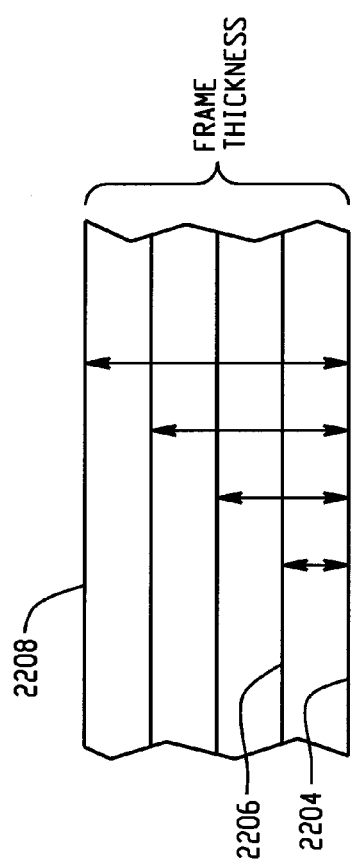

FIGS. 22 and 23 illustrate aspects of a protective inner layer including a plurality of nested frames. In FIG. 22, each rectangle depicts one of the plurality of nested frames 2202, with each frame being of a different thickness. Because electronic devices come in an assortment of different thicknesses, the nested frames 2202 may be used to better hold a variety of different devices. The configuration is similar to a nested doll structure and allows most portable electronic devices to fit securely within a carrying case with little internal movement. In the example of FIGS. 22 and 23, at a center 2204 of the protective inner layer, an inside level 2206 includes a smallest frame having a smallest thickness. Moving away from the center 2204 of the protective inner layer, towards an outside level 2208, frames have increasingly larger thicknesses. At a perimeter of the protective inner layer, farthest from the center 2204, the outside level

2208 includes a largest frame having a largest thickness. In this embodiment, larger devices may extend closer to the perimeter of the protective inner layer, while smaller devices may remain closer to the center. FIG. 23 depicts thickness variation for the plurality of nested frames 2202 as seen from eye view in FIG. 22 at 2204.

Both the shock-absorbing material 2104 of FIG. 21 and the plurality of nested frames 2202 of FIG. 22 help in enabling the carrying case to transport multiple electronic devices at once, without risking damage to any of them. For example, despite having different thicknesses and dimensions, a netbook device and a thin cell phone may be transported simultaneously. Each device may be held securely within the protective inner layer and may be isolated from collisions with the other device based on qualities of the protective inner layers described with respect to FIGS. 21-23. Additional other smaller devices and items may be held in the carrying case, with or without a larger portable device, including portable music players, smart phones, keys, business cards, credit cards, wallets, and device styluses.

Figure 24:
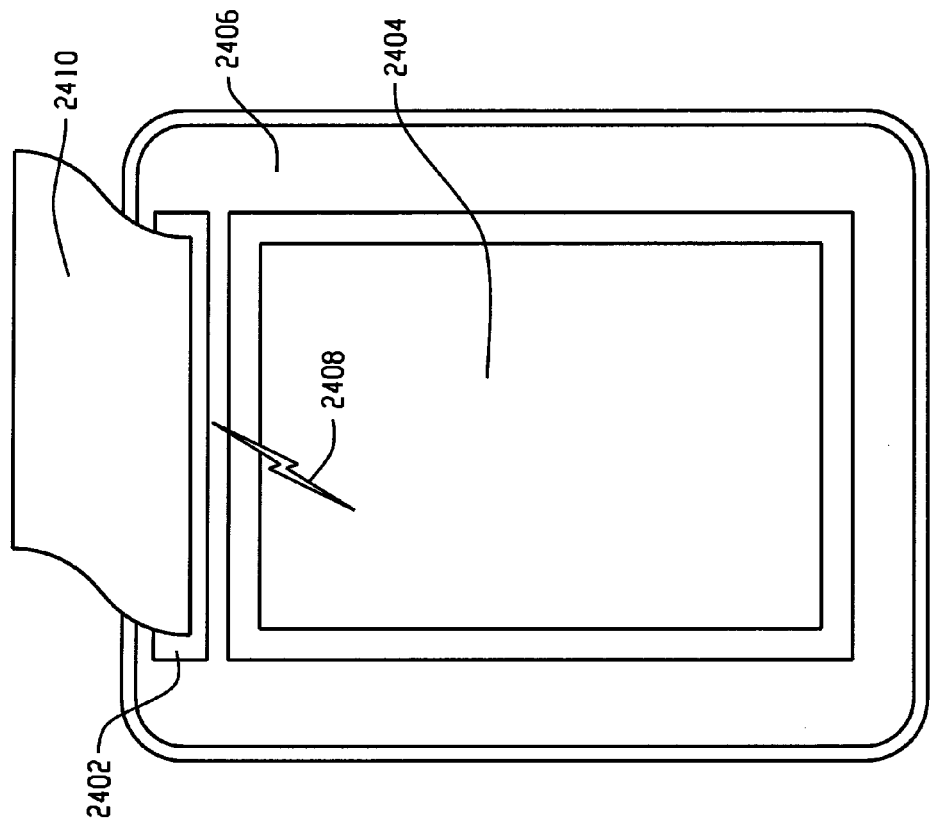
FIG. 24 depicts an encasing structure including a printer.

FIG. 24 depicts an encasing structure including a printer. The printer 2402 is configured to print a document based on a command received from an electronic device 2404 held within the encasing structure 2406 or from an external device. The printer may be configured to receive the command via a wireless protocol 2408 (e.g., Bluetooth, IEEE 802.11) or via a wired connection. Paper 2410 used with the printer 2402 may be smaller and of a different material than standard 8.5 inch by 11 inch printer/copier paper or may conform to standard sizes. Further, the encasing structure 2406 may be configured to hold only a certain number of printable sheets of paper 2410 (e.g., 5-20) to reduce a weight of the encasing structure 2406, or, alternatively, the printer 2402 may be configured to be fed paper 2410 manually. The printer 2402 may be powered by a power supply component of the encasing structure 2406 (e.g., a rechargeable battery, a photovoltaic solar panel array, a motion energy capture mechanism, etc.) or by an external power supply (e.g., an external battery, a connection to a standard electrical wall outlet). The printer 2402 may enable users to print, for example, maps, notes, documents, and pictures.

Figure 25:
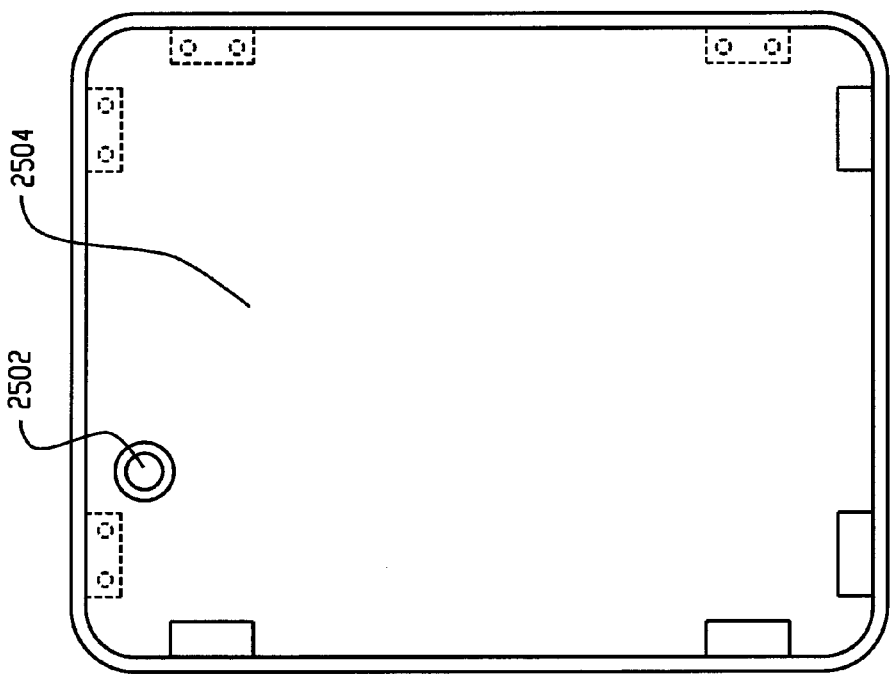
FIG. 25 depicts an encasing structure including an opening on one side.

FIG. 25 depicts an encasing structure including an opening on one side. The opening 2502 facilitates interaction with an electronic device held within the encasing structure 2504. The opening 2502 may be configured to be used for a variety of purposes (e.g., enabling a charging cable to be connected to the device, providing a camera port for a camera-enabled device, enabling a user to press a button on the device, enabling the user to view an LED on the device, etc.).

Figure 26:
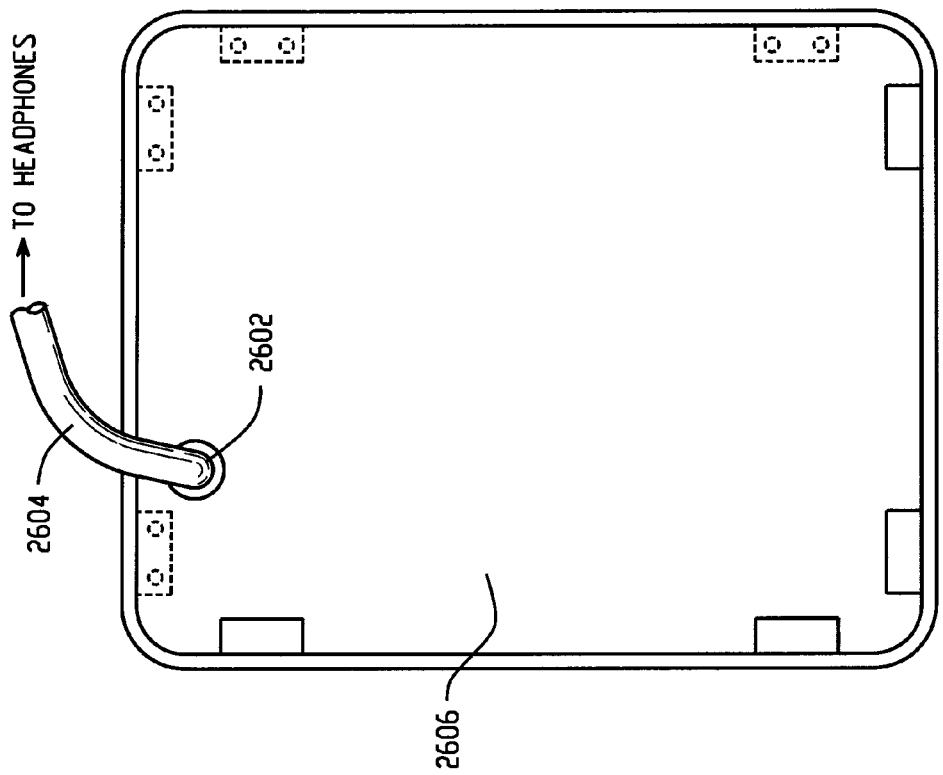
FIG. 26 depicts an encasing structure including an audio recess.

FIG. 26 depicts an encasing structure including an audio recess. The audio recess 2602 is configured to facilitate connection of headphones 2604 or speakers to an electronic device held within the encasing structure 2606. Alternatively, the audio recess 2602 may allow an audio-out cable to be connected between the device and an amplifier via an audio jack. The opening 2502 of FIG. 25 and the audio recess 2602 of FIG. 26 may be designed to prevent entry of dust, water, or other foreign matter to an inner portion of the encasing structure at all times.

FIG. 27 depicts an example multi-configuration device carrying case including a number of features. These features include one or more batteries 2702, an external charging port 2704, a universal serial bus (USB) port 2706, a global positioning system (GPS) transmitter chip 2708, an emergency button 2710, a hazardous conditions detector 2712, a weather-proof clock display 2714 (e.g., an atomic clock), and a perimeter area 2716 configured to emit light.

The one or more batteries 2702 can be used to provide power to an electronic device held within an encasing structure 2718 or to an external device. The one or more batteries 2702 may be, for example, rechargeable batteries. To provide power to the external device, the external charging port 2704 is used to allow the external device to connect to the one or more batteries 2702. Alternatively, the external charging port 2704 may be configured allow the one or more batteries 2702 to be connected to an external source of power, to enable them to be recharged.

The USB port 2706 of FIG. 27 may be configured to facilitate a number of services. In one embodiment, the USB port 2706 enables charging of external, USB-charged electronic devices from the one or more batteries 2702. In another embodiment, the USB port 2706 may be connected to a standard electrical wall outlet, enabling the one or more batteries 2702 and/or the device held within the encasing structure 2718 to be charged by this connection.

The GPS transmitter chip 2708 embedded within the encasing structure 2718 may enable the device carrying case to be located quickly and easily if ever lost or stolen or in an emergency situation. Relevantly, in the emergency situation, the emergency button 2710 may be used. If the user is in distress or trouble, pressing the emergency button 2710 may cause a loud and repeating sound to be emitted to attract attention and assistance. Distress signals (e.g., 911 call) may be made via the carrying case or via an enclosed electronic device. Another related feature depicted in FIG. 27 is the hazardous conditions detector 2712. When a hazardous condition is detected (e.g., smoke, poisonous gases, radiation), the hazardous conditions detector 2712 may cause a loud and repeating warning sound to be emitted to alert the user of the condition. Another safety feature included on the carrying case of FIG. 27 is the perimeter area 2716 configured to emit light. This feature may help to make the user distinguishable in low lighting situations, allow a location of the carrying case to be determined, or provide a light source to the user. Alternatively, the perimeter area 2716 may be configured to include a highly reflective material.

The encasing structure 2718 of FIG. 27 also features the weatherproof clock display 2714 (e.g., an atomic clock), which may be configured to display a local time and date. The clock may be configured to provide a programmable alarm function.

Numerous other features may be included on the disclosed device carrying case. For example, one embodiment of the device carrying case may include speakers embedded within the encasing structure. This feature allows the user to hear audio from the electronic device without the need for earphones.

Another feature that may be included is a waterproof, airtight encasing structure that is configured to float if dropped into a body of water. Further, the waterproof, airtight encasing structure may be configured to enable underwater use of the carrying case, while still protecting the device held within (e.g., while swimming, scuba diving, working underwater, military exercises). In one embodiment, when configured for underwater use, the user may have the ability to open the carrier and access the electronic device without getting the device wet (e.g., interact with touch screen via protective but capacitively conductive transparent layer).

Another embodiment of the device carrying case may utilize a "military grade" design. This design may include enhanced durability and environmentally impervious features that may allow the carrying case to protect an electronic device under a wide variety of unfavorable conditions. For example, the outer shell material may be made of a military-grade, impact resistant material (e.g., Kevlar™). Further, the inner material of the encasing structure may be hardened or otherwise modified to provide extra protection, such that even if the carrying case is subject to very rough treatment, the electronic device is not damaged or denigrated. Further, the carrying case may be designed to withstand extreme temperature conditions that may be encountered by military personnel. The carrying case may further be designed to protect an electronic device from various interferences, including damaging interferences like electromagnetic pulses.

The device carrying case may also include an ability to send and receive information packs contained within light signals. For example, the carrying case may be enabled to allow transmission of a laser beam between the electronic device held within the carrying case and another device outside of the carrying case. The laser beam may include user information (e.g., name, address, phone number, email address) and/or other information within its pulse. This feature may be used to enable the user to exchange an "electronic business card" with another user without having to remove the electronic device from the carrying case. Similarly, the device carrying case may also enable electronic devices with projection capabilities to project images and video onto a wall or screen while being held within the carrying case.

The device carrying case disclosed herein may be made in many different colors, styles and veneers, including fabric, leather, wood, rubber, metal, and other desirable materials. The materials used may utilize the latest advances in nanotechnology (e.g., composite materials, flexible electronic materials, scratch-resistant coatings, etc.). Specific designer labels may be made apparent on the outer shell material and/or inner material. Further, the outer shell material may be configured to have a variety of different finishes (e.g., high gloss, matte, textured, etc.).

FIG. 28 depicts an example multi-configuration device carrying case including a clip mechanism. In the example of FIG. 28, an encasing structure 2802 includes a thigh strap 2804 for connection around an upper leg of a user and the clip mechanism 2806 for clipping on the user's belt or another suitable area. The clip mechanism 2806 is configured to be retractable, allowing it to recede into a retraction port 2808 of the encasing structure 2802 when not in use.

Figure 29:
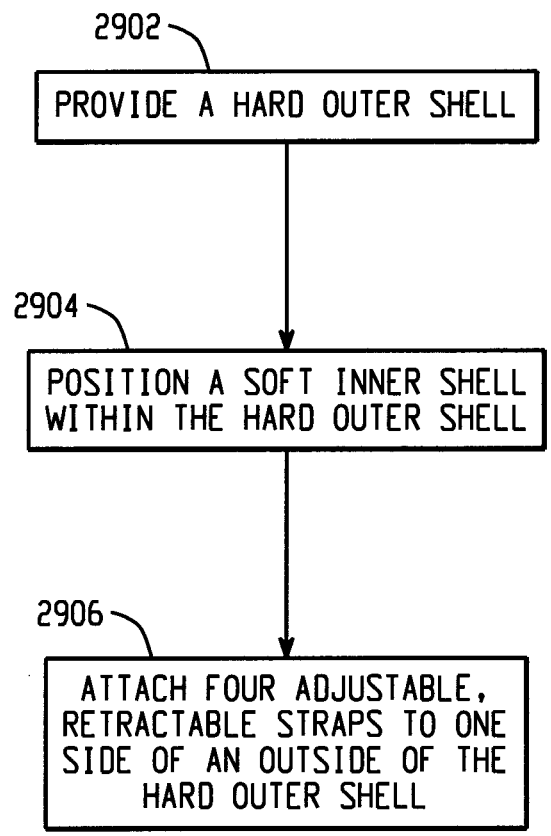
FIG. 29 is a flow chart illustrating a method of manufacturing a multi-configuration electronic device carrying case.

FIG. 29 is a flow chart illustrating a method of manufacturing a multi-configuration electronic device carrying case. At 2902, a hard outer shell is provided. At 2904, a soft inner shell configured to hold an electronic device is positioned within the hard outer shell. At 2906, four adjustable, retractable straps are attached to one side of an outside of the hard outer shell. The one side of the hard outer shell includes a receiving structure for receiving one end of one of the adjustable, retractable straps. The adjustable straps are configured to attach the encasing structure to a person in one of a plurality of configurations. The configurations include a hip holster configuration, where one adjustable strap is used for connection around a waist of the person and one adjustable strap is used for connection around one leg of the person. The configurations also include a back configuration, where one adjustable strap is used for connection around each arm of the person to attach the encasing structure to a back of the person.

It may be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The term "including" is used herein to mean, and is used interchangeably with, the phrase "including but not limited to." The term "or" is used herein to mean, and is used interchangeably with, the term "and/or," unless context clearly indicates otherwise. The term "such as" is used herein to mean, and is used interchangeably, with the phrase "such as but not limited to." The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It is claimed:

1. A multi-configuration electronic device carrying case, comprising:
   a protective encasing structure configured to receive and hold an electronic device, the encasing structure including a length and a width,
      wherein the encasing structure includes an outer shell and a protective inner layer,
      wherein the encasing structure further includes a temperature insulating material positioned between the outer shell and the protective inner layer,
      wherein the carrying case is configured to float when placed into a body of water,
      wherein the protective inner layer includes a plurality of nested frames, wherein the frames are of varying thicknesses, wherein an outside level includes a largest frame having a largest thickness, and wherein an inside level includes a smallest frame having a smallest thickness,
      wherein the encasing structure further includes an integrated printer in the interior of the encasing structure, wherein the printer is configured to print a document based on a command received from the electronic device held within the encasing structure; and
   at least four adjustable straps configured to attach the encasing structure to a person in one of a plurality of configurations, wherein the configurations include:
      a hip holster configuration, wherein the hip holster configuration utilizes two adjustable straps, one adjustable strap for connection around a waist of the person and one adjustable strap for connection around one leg of the person, each of the two adjustable straps being connected to the encasing structure at a respective set of two attachment points on one face of the encasing structure separated along the width of the encasing structure; and a back configuration, wherein the back configuration utilizes two adjustable straps, one adjustable strap for connection around each arm of the person, attaching the encasing structure to a back of the person, each of the two adjustable straps being connected to the encasing structure at a respective set of two attachment points on the one face of the encasing structure separated across the length of the encasing structure;

the four attachment points separated along the width of the encasing structure being different than the four attachment points separated across the length of the encasing structure;

wherein the four adjustable straps are retractable straps under tension that are configured to substantially recede into the encasing structure when not connected, wherein one end of each of the four adjustable straps is permanently connected to the encasing structure.

2. The carrying case of claim 1, wherein the carrying case includes four adjustable straps, wherein the hip holster configuration provides a first adjustable strap for connection around the waist and a second adjustable strap for connection around the one leg, and wherein the back configuration provides a third adjustable strap for connection around a left arm of the person and a fourth adjustable strap for connection around the right arm of the person.

3. The carrying case of claim 2, wherein the back configuration further utilizes the second adjustable strap used in the hip holster configuration for connection around the waist.

4. The carrying case of claim 2, wherein the configurations further include a front configuration, wherein the front configuration provides one adjustable strap for connection around each arm of the person, attaching the encasing structure to a front of the person.

5. The carrying case of claim 4, wherein the front configuration attaches the encasing structure to a chest of the person.

6. The carrying case of claim 1, wherein the configurations further include a side holster configuration, wherein the side holster configuration provides one adjustable strap for connection around one arm of the person and one adjustable strap for connection around a chest of the person, attaching the encasing structure under the one arm of the person.

7. The carrying case of claim 1, wherein a first end of an adjustable strap is permanently connected to the encasing structure, wherein the encasing structure includes a receiving structure for attaching a second end of the adjustable straps for use in connecting the encasing structure to the person.

8. The carrying case of claim 1, wherein the outer shell comprises a polycarbonate composite, metal, leather, hardened glass, plexiglass, or composite material.

9. The carrying case of claim 1, wherein the protective inner layer comprises cloth, memory foam, or visco-elastic polyurethane foam.

10. The carrying case of claim 1, wherein the encasing structure includes an opening on one side, wherein the opening facilitates interaction with an electronic device while the electronic device is held within the encasing structure.

11. The carrying case of claim 1, wherein the one adjustable strap for connection around the one leg of the person is configured for connection around an upper portion of the one leg.

12. The carrying case of claim 1, wherein the protective encasing structure is configured to be waterproof and airtight.

13. The carrying case of claim 1, wherein the hip holster configuration holds the electronic device on a hip or a thigh of the person.

14. The carrying case of claim 1, wherein the encasing structure is further configured to receive and hold additional items.

15. The carrying case of claim 14, wherein the additional items include a second electronic device, a set of keys, a business card, a credit card, a wallet, or a device stylus.

16. The carrying case of claim 1, wherein each of the attachment points is configured to direct a connected strap to exactly one of the other attachment points.

* * * * *